US011689409B2

(12) United States Patent
Bar-Or Tillinger et al.

(10) Patent No.: US 11,689,409 B2
(45) Date of Patent: Jun. 27, 2023

(54) INDEX MODULATION FOR LOW-POWER ANALOG-TO-DIGITAL CONVERTERS

(71) Applicant: QUALCOMM Incorporated, San Diego, CA (US)

(72) Inventors: Amit Bar-Or Tillinger, Tel-Aviv (IL); Assaf Touboul, Netanya (IL); Shay Landis, Hod Hasharon (IL); Idan Michael Horn, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 200 days.

(21) Appl. No.: 17/161,389

(22) Filed: Jan. 28, 2021

(65) Prior Publication Data

US 2022/0239543 A1 Jul. 28, 2022

(51) Int. Cl.
*H04L 27/26* (2006.01)
*H04B 17/336* (2015.01)
(Continued)

(52) U.S. Cl.
CPC ....... *H04L 27/2697* (2013.01); *H04B 17/336* (2015.01); *H04L 1/0003* (2013.01);
(Continued)

(58) Field of Classification Search
CPC ... H04B 17/336; H04L 1/0003; H04L 5/0094; H04L 27/2634; H04L 27/2697;
(Continued)

(56) References Cited

U.S. PATENT DOCUMENTS 8,923,422 B2 * 12/2014 Hui ................ H04L 5/0032
375/260
9,173,113 B2 * 10/2015 Ohwatari ............ H04B 7/0865
(Continued)

FOREIGN PATENT DOCUMENTS

BR 112019009303 A2 * 7/2019 ............... H04L 1/00
CN 106453190 A * 2/2017
(Continued)

OTHER PUBLICATIONS

Chafii et al., DCT-OFDM With Index Modulation, Jul. 2017, IEEE Communications Letters, vol. 21, No. 7, pp. 1489-1492, DOI: 10.1109/LCOMM.2017.2682843 (Year: 2017).*
(Continued)

*Primary Examiner* — Eric Nowlin
(74) *Attorney, Agent, or Firm* — Holland & Hart LLP

(57) ABSTRACT

Methods, systems, and devices for wireless communications are described for optimizing index modulated (IM) communications between a user equipment (UE) and a base station. The UE may identify a quantity of subcarriers for IM communications and transmit a message including an indication of the quantity of subcarriers to the base station. In some examples, the UE may transmit an indication of one or more subcarriers to exclude from IM communications. The base station may receive the indication of the quantity of subcarriers and/or the indication of the blacklisted subcarrier (s) and may determine a number of active subcarriers to be used based on at least the indication of the quantity of subcarriers. The base station may transmit an indication of the number of active subcarriers to the UE. The UE may process one or more received IM downlink signals based on the quantity of subcarriers.

30 Claims, 15 Drawing Sheets

(51) Int. Cl.
  *H04L 1/00*   (2006.01)
  *H04L 5/00*   (2006.01)
  *H04L 27/36*  (2006.01)
  *H04W 72/23*  (2023.01)

(52) U.S. Cl.
  CPC .......... *H04L 5/0094* (2013.01); *H04L 27/361* (2013.01); *H04W 72/23* (2023.01)

(58) Field of Classification Search
  CPC .. H04L 27/30; H04L 27/361; H04W 52/0212; H04W 52/0251; H04W 72/042; Y02D 30/70
  See application file for complete search history.

(56) References Cited

U.S. PATENT DOCUMENTS

| | | | | |
|---|---|---|---|---|
| 10,893,477 | B2* | 1/2021 | Vijayan | H04W 52/0238 |
| 11,070,320 | B2* | 7/2021 | Davydov | H04L 5/0073 |
| 11,165,619 | B2* | 11/2021 | Wilhelmsson | H04L 1/0009 |
| 2013/0163462 | A1* | 6/2013 | Ohwatari | H04B 7/0857 370/252 |
| 2013/0251053 | A1* | 9/2013 | Hui | H04L 5/0032 375/260 |
| 2019/0261372 | A1* | 8/2019 | Zhou | H04L 5/0048 |
| 2019/0268201 | A1* | 8/2019 | Wilhelmsson | H04L 1/0003 |
| 2019/0363831 | A1* | 11/2019 | Davydov | H04L 5/0053 |
| 2019/0394730 | A1* | 12/2019 | Vijayan | H04L 27/0008 |
| 2021/0281456 | A1* | 9/2021 | Yunusov | H04L 27/30 |
| 2021/0288782 | A1* | 9/2021 | Horn | H04W 72/0406 |
| 2022/0287016 | A1* | 9/2022 | Landis | H04L 27/2613 |

FOREIGN PATENT DOCUMENTS

| | | | | |
|---|---|---|---|---|
| CN | 106656897 | A * | 5/2017 | |
| CN | 108900291 | A * | 11/2018 | H04L 27/2601 |
| CN | 109617849 | A * | 4/2019 | H04L 27/2601 |
| CN | 109937546 | A * | 6/2019 | H04L 1/00 |
| CN | 108900291 | B * | 10/2020 | H04L 27/2601 |
| CN | 109617849 | B * | 4/2021 | H04L 27/2601 |
| CN | 113746768 | A * | 12/2021 | |
| CN | 109937546 | B * | 6/2022 | H04L 1/00 |
| EP | 2704336 | A1 * | 3/2014 | H04B 7/0851 |
| JP | 2020511800 | A * | 4/2020 | |
| KR | 20210064741 | A * | 6/2021 | |
| KR | 102297614 | B1 * | 9/2021 | |
| RU | 2719765 | C1 * | 4/2020 | H04L 1/00 |
| WO | WO-2018086685 | A1 * | 5/2018 | H04L 1/00 |
| WO | WO-2019069168 | A1 * | 4/2019 | |
| WO | WO-2021183264 | A1 * | 9/2021 | H04L 5/14 |
| WO | WO-2022109027 | A1 * | 5/2022 | |
| WO | WO-2022164674 | A1 * | 8/2022 | H04B 17/336 |
| WO | WO-2022182304 | A1 * | 9/2022 | |

OTHER PUBLICATIONS

Jaradat et al., OFDM With Subcarrier Number Modulation, Dec. 2018, IEEE Wireless Communications Letters, vol. 7, No. 6, pp. 914-917, DOI: 10.1109/LWC.2018.2839624 (Year: 2018).*

Jaradat et al., Orthogonal Frequency Division Multiplexing With Subcarrier Gap Modulation, Oct. 8, 2020, 2020 IEEE 31st Annual International Symposium on Personal, Indoor and Mobile Radio Communications, 2020, pp. 1-6, DOI: 10.1109/PIMRC48278.2020. 9217187 (Year: 2020).*

Kim et al., Use of linear programming for dynamic subcarrier and bit allocation in multiuser OFDM, Jul. 17, 2006, IEEE Transactions on Vehicular Technology, vol. 55, No. 4, pp. 1195-1207, DOI: 10.1109/TVT.2006.877490 (Year: 2006).*

Mrkic et al., Index modulation techniques in OFDM relay systems for 5G wireless networks, Oct. 23, 2017, 2017 40th International Conference on Telecommunications and Signal Processing (TSP), 2017, pp. 208-211, DOI: 10.1109/TSP.2017.8075970 (Year: 2017).*

Ma et al., Subcarrier Allocation for OFDM With Index Modulation, Jul. 2016, IEEE Communications Letters, vol. 20, No. 7, pp. 1469-1472, DOI: 10.1109/LCOMM.2016.2560171 (Year: 2016).*

Abu-alhiga et al., Subcarrier-Index Modulation OFDM, Apr. 15, 2010, 2009 IEEE 20th International Symposium on Personal, Indoor and Mobile Radio Communications, 2009, pp. 177-181, DOI: 10.1109/PIMRC.2009.5449882 (Year: 2010).*

Zhan et al., A Random Subcarrier-Selection Method Based on Index Modulation for Secure Transmission, Mar. 31, 2022, Sensors 2022, 22, 2676, pp. 1-17 (Year: 2022).*

Dang S., et al., "Adaptive OFDM Index Modulation for Two-Hop Relay-Assisted Networks", arxiv.org, Cornell University Library, 201 Olin Library Cornell University Ithaca, NY 14853, Jun. 20, 2017 (Jun. 20, 2017), pp. 1-30, XP080771345, DOI: 10.1109/TWC. 2017.2787056 Section II, figure 1 Section III, figure 2.

Dang S., et al., "Enhanced Huffman Coded OFDM With Index Modulation", IEEE Transactions on Wireless Communications, IEEE Service Center, Piscataway, NJ, US, vol. 19, No. 4, Jan. 17, 2020 (Jan. 17, 2020), pp. 2489-2503, XP011783095, ISSN: 1536-1276, DOI: 10.1109/TWC.2020.2965524, [retrieved on Apr. 9, 2020], Sections I. to III., table I.

International Search Report and Written Opinion—PCT/US2022/ 012754—ISA/EPO—dated Apr. 11, 2022.

Memisoglu E., et al., "Fading-Aligned OFDM with Index Modulation for mMTC Services", Physical Communication, Elsevier, Amsterdam, NL, vol. 35, Mar. 29, 2019 (Mar. 29, 2019), pp. 1-7, XP085741188, ISSN: 1874-4907, DOI: 10.1016/J.PHYCOM.2019. 03.008, [retrieved on Mar. 29, 2019], Sections 2, and 3., figure 1.

* cited by examiner

INDEX MODULATION FOR LOW-POWER ANALOG-TO-DIGITAL CONVERTERS

FIELD OF TECHNOLOGY

The following relates to wireless communications, including index modulation for low-power analog-to-digital converters (ADCs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may process a signal received from another devices (such as another UE or base station) using an analog-to-digital converter (ADC). In some cases, power consumption at the UE may be affected by a sampling frequency and a resolution of the ADC. As some systems may operate in relatively higher carrier frequencies, and correspondingly increased sampling frequencies, a UE may be affected by increased power consumption when receiving and processing signals at higher frequencies.

SUMMARY

The described techniques relate to improved methods, systems, devices, and apparatuses that support index modulation for low-power analog-to-digital converters (ADCs). Generally, the described techniques provide for a user equipment (UE) identifying a quantity of subcarriers (e.g., a preferred quantity) for index modulated (IM) communications with a base station, where the base station may determine one or more active subcarriers for the UE to use based on the quantity of subcarriers. In some examples, the quantity of subcarriers may be based on a signal-to-quantization nose ratio (SQNR) experienced by the UE, as well as various power consumption factors allowed by the UE. Additionally or alternatively, the quantity of subcarriers may be based on a signal-to-noise ratio (SNR) experienced by the UE. In any case, the UE may transmit (e.g., as part of uplink control information (UCI)), to the base station, an indication of the preferred quantity of subcarriers. Additionally, the UE may transmit a set of "blacklisted" subcarriers (e.g., a set of subcarriers which the UE prefers to avoid, which may be based on subcarriers having a probability of being masked by spurs) to the base station, which the base station may exclude from IM communications. In some examples, the UE may include the set of blacklisted subcarriers in the UCI message.

Upon receiving the indication of the quantity of subcarriers, the base station may determine a quantity of active subcarriers for subsequent IM communications. The base station may determine the quantity of active subcarriers based on the preferred subcarrier quantity indication and, in some cases, the blacklisted subcarriers. The base station may transmit a message (e.g., as part of downlink control information (DCI)), to the UE, including an indication of the quantity of active subcarriers. Additionally, if the UE transmitted an indication of blacklisted subcarriers, the base station may, in response, transmit an acknowledgement that the blacklist indication was received. For example, the base station may transmit an acknowledgement that the base station ignored the blacklisted subcarriers indicated by the UE. In other cases, the base station may transmit a list of subcarriers excluded from IM communications. The UE may receive the DCI message configuring the indicated active subcarriers for communications with the base station. Thus, enhanced signaling of IM communications may allow the UE to reduce the ADC resolution, resulting in conserved power at the UE, more efficient communications, and overall improved system efficiency.

A method for wireless communication at a UE is described. The method may include identifying, from a set of multiple subcarriers within a bandwidth, a quantity of subcarriers for index modulated communications, the quantity of subcarriers being identified based on an SQNR, an SNR, one or more power consumption factors of the UE, or any combination thereof, transmitting, to a base station, a message including an indication of the quantity of subcarriers, and processing an index modulated downlink signal based on the quantity of subcarriers.

An apparatus for wireless communication at a UE is described. The apparatus may include a processor, memory in electronic communication with the processor, and instructions stored in the memory. The instructions may be executable by the processor to cause the apparatus to identify, from a set of multiple subcarriers within a bandwidth, a quantity of subcarriers for index modulated communications, the quantity of subcarriers being identified based on an SQNR, an SNR, one or more power consumption factors of the UE, or any combination thereof, transmit, to a base station, a message including an indication of the quantity of subcarriers, and process an index modulated downlink signal based on the quantity of subcarriers.

Another apparatus for wireless communication at a UE is described. The apparatus may include means for identifying, from a set of multiple subcarriers within a bandwidth, a quantity of subcarriers for index modulated communications, the quantity of subcarriers being identified based on an SQNR, an SNR, one or more power consumption factors of the UE, or any combination thereof, means for transmitting, to a base station, a message including an indication of the quantity of subcarriers, and means for processing an index modulated downlink signal based on the quantity of subcarriers.

A non-transitory computer-readable medium storing code for wireless communication at a UE is described. The code may include instructions executable by a processor to identify, from a set of multiple subcarriers within a bandwidth, a quantity of subcarriers for index modulated communications, the quantity of subcarriers being identified based on an SQNR, an SNR, one or more power consumption factors of the UE, or any combination thereof, transmit, to a base station, a message including an indication of the quantity of subcarriers, and process an index modulated downlink signal based on the quantity of subcarriers.

Some examples of the method, apparatuses, and non-transitory computer-readable medium described herein may further include operations, features, means, or instructions for identifying, from the set of multiple subcarriers within the bandwidth, a set of one or more subcarriers to be excluded from the index modulated communications and transmitting, to the base station, an indication of the set of one or more subcarriers.

Some examples of the method, apparatuses, and non-transitory computer-readable medium described herein may further include operations, features, means, or instructions for identifying one or more subcarrier indices corresponding to the set of one or more subcarriers, where the indication of the set of one or more subcarriers includes the one or more subcarrier indices.

Some examples of the method, apparatuses, and non-transitory computer-readable medium described herein may further include operations, features, means, or instructions for identifying one or more spurs associated with processing signals using an ADC of the UE, where the set of one or more subcarriers to be excluded from the index modulated communications may be based on the one or more spurs.

In some examples of the method, apparatuses, and non-transitory computer-readable medium described herein, the indication of the set of one or more subcarriers may be transmitted within the message.

Some examples of the method, apparatuses, and non-transitory computer-readable medium described herein may further include operations, features, means, or instructions for receiving, from the base station, a second message including an acknowledgement of the set of one or more subcarriers to be excluded.

In some examples of the method, apparatuses, and non-transitory computer-readable medium described herein, the second message includes an indication that the set of one or more subcarriers may be excluded from the index modulated communications or a list of subcarriers that may be excluded from the index modulated communications.

Some examples of the method, apparatuses, and non-transitory computer-readable medium described herein may further include operations, features, means, or instructions for receiving, from the base station, a third message including an indication of a quantity of active subcarriers for the index modulated communications, the quantity of active subcarriers being based on the indication of the quantity of subcarriers and receiving the index modulated downlink signal over one or more active subcarriers.

In some examples of the method, apparatuses, and non-transitory computer-readable medium described herein, the message including the indication of the quantity of subcarriers may be transmitted with a first periodicity and the third message indicating the quantity of active subcarriers may be received with a second periodicity different from the first periodicity.

In some examples of the method, apparatuses, and non-transitory computer-readable medium described herein, the third message and the index modulated downlink signal may be received within a same time period.

In some examples of the method, apparatuses, and non-transitory computer-readable medium described herein, the third message includes DCI.

In some examples of the method, apparatuses, and non-transitory computer-readable medium described herein, the message includes UCI.

In some examples of the method, apparatuses, and non-transitory computer-readable medium described herein, processing the index modulated downlink signal may include operations, features, means, or instructions for processing the index modulated downlink signal using an ADC, the ADC being configured with a resolution size based on the quantity of subcarriers.

In some examples of the method, apparatuses, and non-transitory computer-readable medium described herein, identifying the quantity of subcarriers may include operations, features, means, or instructions for determining a percentage of active subcarriers from the set of multiple subcarriers, where the indication of the quantity of subcarriers includes an indication of the percentage of active subcarriers.

In some examples of the method, apparatuses, and non-transitory computer-readable medium described herein, the one or more power consumption factors include a battery status of the UE, one or more thermal parameters, power consumption allowed by the UE, or any combination thereof.

A method for wireless communications at a base station is described. The method may include receiving, from a UE, a first message including an indication of a quantity of subcarriers, the quantity of subcarriers being from a set of multiple subcarriers within a bandwidth, where the quantity of subcarriers is based on an SQNR, an SNR, one or more power consumption factors of the UE, or any combination thereof, determining, based on the indication of the quantity of subcarriers, a quantity of active subcarriers of the set of multiple subcarriers for index modulated communications with the UE, and transmitting, to the UE, a second message including an indication of the quantity of active subcarriers.

An apparatus for wireless communications at a base station is described. The apparatus may include a processor, memory in electronic communication with the processor, and instructions stored in the memory. The instructions may be executable by the processor to cause the apparatus to receive, from a UE, a first message including an indication of a quantity of subcarriers, the quantity of subcarriers being from a set of multiple subcarriers within a bandwidth, where the quantity of subcarriers is based on an SQNR, an SNR, one or more power consumption factors of the UE, or any combination thereof, determine, based on the indication of the quantity of subcarriers, a quantity of active subcarriers of the set of multiple subcarriers for index modulated communications with the UE, and transmit, to the UE, a second message including an indication of the quantity of active subcarriers.

Another apparatus for wireless communications at a base station is described. The apparatus may include means for receiving, from a UE, a first message including an indication of a quantity of subcarriers, the quantity of subcarriers being from a set of multiple subcarriers within a bandwidth, where the quantity of subcarriers is based on an SQNR, an SNR, one or more power consumption factors of the UE, or any combination thereof, means for determining, based on the indication of the quantity of subcarriers, a quantity of active subcarriers of the set of multiple subcarriers for index modulated communications with the UE, and means for transmitting, to the UE, a second message including an indication of the quantity of active subcarriers.

A non-transitory computer-readable medium storing code for wireless communications at a base station is described. The code may include instructions executable by a processor to receive, from a UE, a first message including an indication of a quantity of subcarriers, the quantity of subcarriers being from a set of multiple subcarriers within a bandwidth, where the quantity of subcarriers is based on an SQNR, an SNR, one or more power consumption factors of the UE, or any combination thereof, determine, based on the indication of the quantity of subcarriers, a quantity of active subcarriers of the set of multiple subcarriers for index modulated communications with the UE, and transmit, to the UE, a second message including an indication of the quantity of active subcarriers.

Some examples of the method, apparatuses, and non-transitory computer-readable medium described herein may further include operations, features, means, or instructions for receiving, from the UE, an indication of a set of one or more subcarriers from the set of multiple subcarriers to be excluded from the index modulated communications, where determining the quantity of active subcarriers may be based on the set of one or more subcarriers to the excluded from the index modulated communications.

In some examples of the method, apparatuses, and non-transitory computer-readable medium described herein, the indication of the set of one or more subcarriers includes one or more subcarrier indices corresponding to the set of one or more subcarriers to be excluded from the index modulated communications.

In some examples of the method, apparatuses, and non-transitory computer-readable medium described herein, the set of one or more subcarriers to be excluded from the index modulated communications may be based on one or more spurs associated with processing signals using an ADC of the UE.

In some examples of the method, apparatuses, and non-transitory computer-readable medium described herein, the indication of the set of one or more subcarriers may be received within the first message.

Some examples of the method, apparatuses, and non-transitory computer-readable medium described herein may further include operations, features, means, or instructions for transmitting, to the UE, a third message including an acknowledgement of the set of one or more subcarriers to be excluded.

In some examples of the method, apparatuses, and non-transitory computer-readable medium described herein, the third message includes an indication that the set of one or more subcarriers may be excluded from the index modulated communications or a list of subcarriers that may be excluded from the index modulated communications.

In some examples of the method, apparatuses, and non-transitory computer-readable medium described herein, the first message including the indication of the quantity of subcarriers may be received with a first periodicity and the second message indicating the quantity of active subcarriers may be transmitted with a second periodicity different from the first periodicity.

Some examples of the method, apparatuses, and non-transitory computer-readable medium described herein may further include operations, features, means, or instructions for transmitting, to the UE, an index modulated downlink signal over one or more active subcarriers of the quantity of subcarriers based on the indication of the quantity of active subcarriers.

In some examples of the method, apparatuses, and non-transitory computer-readable medium described herein, the second message and the index modulated downlink signal may be transmitted within a same time period.

In some examples of the method, apparatuses, and non-transitory computer-readable medium described herein, the indication of the quantity of subcarriers includes an indication of a percentage of active subcarriers of the set of multiple subcarriers.

In some examples of the method, apparatuses, and non-transitory computer-readable medium described herein, the one or more power consumption factors include a battery status of the UE, one or more thermal parameters, power consumption allowed by the UE, or any combination thereof.

In some examples of the method, apparatuses, and non-transitory computer-readable medium described herein, the first message includes UCI.

DETAILED DESCRIPTION

Figure 1:
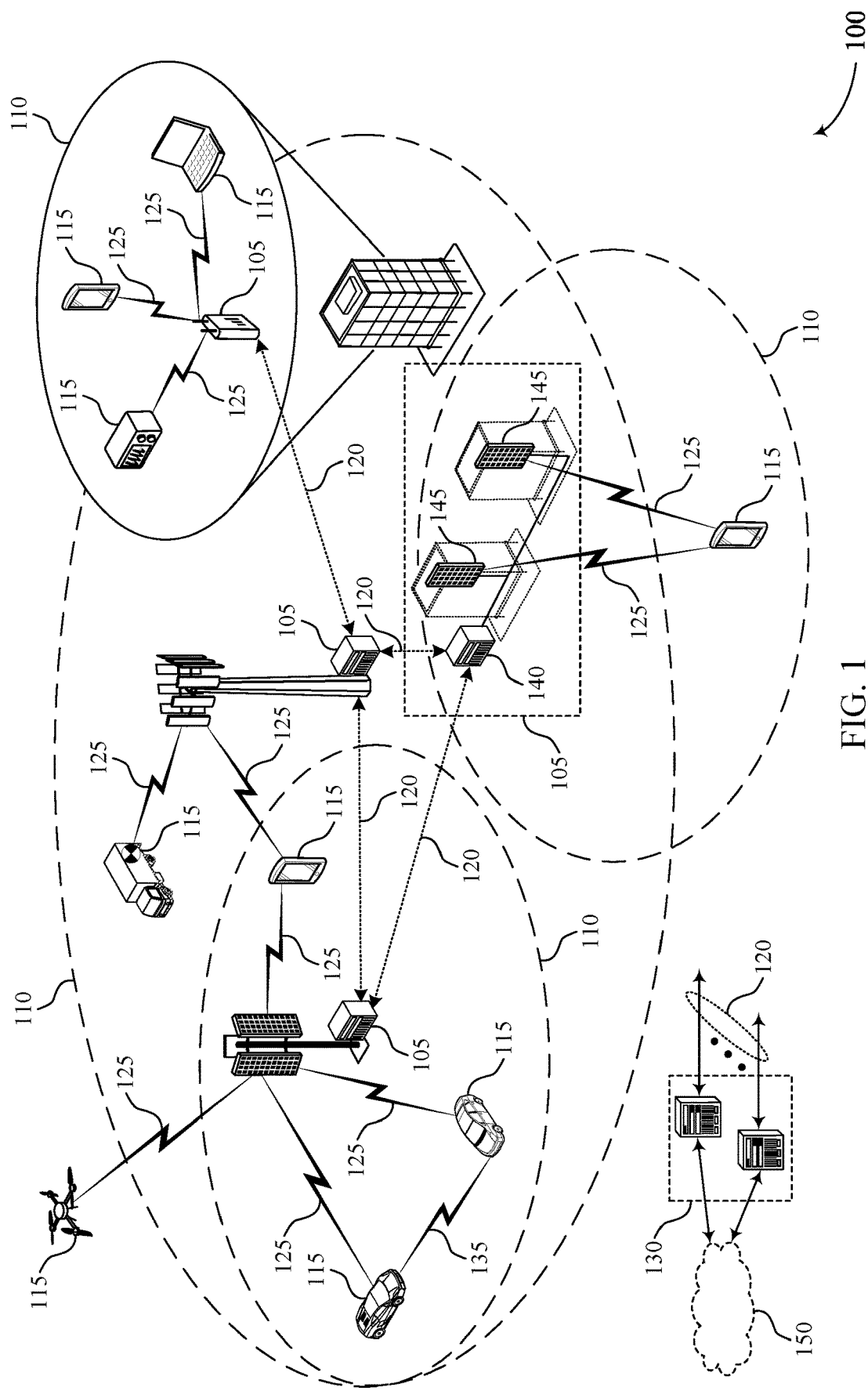
FIG. 1 illustrates an example of a wireless communications system that supports index modulation for low-power analog-to-digital converters (ADCs) in accordance with aspects of the present disclosure.

In some wireless communications systems, a wireless device may process a signal received from another wireless device using an analog-to-digital converter (ADC). A sampling rate of an ADC may be based on the carrier frequency of the received signal. For example, in systems that support relatively higher carrier frequencies (e.g., such as frequency bands used in systems supporting frequency range 4 (FR4) (e.g., 52.6 GHz-114.25 GHz bands), FR5 (which may be referred to as "upper millimeter wave bands" or a "sub-THz regime), FR6 (e.g., bands up to 3 THz), 5G communications, 6G communications, or the like), an ADC may likewise operate at higher sampling frequencies. In addition, the resolution of the processed signal (e.g., the digital output of the ADC) may be based on the number of bits the ADC is configured to support. For example, an ADC resolution may correspond to number of different values recognized by the ADC for an analog input, which may likewise correspond to discrete levels for the digital output of the ADC. The ADC resolution may be referred to as a voltage or a number of bits. In some aspects, a relatively higher number of bits (e.g., a higher ADC resolution) may correspond to a greater resolution of a processed signal (e.g., a relatively higher bit value may correspond to a greater number of discrete digital levels for an output of the ADC).

However, power consumption of the ADC and, subsequently, other components of the UE (e.g., digital front end (DFE) components) may increase as the sampling frequency and resolution (e.g., number of bits) increase. For example, ADC power consumption may increase linearly with the sampling frequency and exponentially with the number of bits used. Consequentially, using relatively higher carrier frequencies may result in greater power consumption at a wireless device. Thus, as a wireless device supports communications over a wide bandwidth of carrier frequencies, optimal system function may be dependent on the ability to modulate or reduce a number of bits used by the ADC. For example, the use of low-resolution ADCs may reduce power consumption at a wireless device, thereby improving power consumption and battery life at a wireless device, particularly those wireless devices operating at relatively higher frequency ranges.

In some wireless communications systems (e.g., LTE, LTE-U, etc.), a UE and a base station may communicate via orthogonal frequency division multiplexing (OFDM) waveforms over an allocated bandwidth. The UE and the base station may use an allocated bandwidth segmented into one or more subcarriers according to some subcarrier spacing, a number of subcarriers, or the like. The allocated bandwidth, however, may constrain the sampling frequency of the ADC at a receiving UE. For instance, the base station may transmit one or more messages using an OFDM waveform over an allocated bandwidth. If the OFDM waveform spans a relatively large bandwidth, the sampling frequency of the UE's ADC may likewise increase, resulting in excess power consumption. Moreover, the allocated bandwidth may constrain the resolution of the ADC. For example, a base station may transmit an OFDM signal such that each subcarrier is transmitted with relatively equal power. A UE may decode the OFDM waveform with an ADC. However, if the quantization noise (e.g., deviations of the signal from the original signal resulting from conversion) inherent to analog-to-digital conversion is relatively high compared to the strength of the signal, the UE may increase the ADC resolution, which may increase power consumption at the UE. Therefore, communicating with OFDM waveforms may result in increased power consumption at the UE and diminished system efficiency.

To overcome the sampling frequency and resolution constraints associated with OFDM communications, the UE and the base station may communicate using index modulated (IM) waveforms over an allocated bandwidth. In such cases, the UE and the base station may determine a number of active subcarriers, where the number of active subcarriers may be less than or equal to the number of subcarriers of the allocated bandwidth. The active subcarriers may correspond to a bandwidth that is smaller than the total allocated bandwidth, which may enable the UE to reduce the sampling frequency of the ADC, thereby saving power when processing signals. Additionally, if a base station transmits an IM waveform with a same total output power as an OFDM waveform, the output power associated with each active subcarrier may be relatively high compared to that of each subcarrier of the OFDM waveform. As such, the signal strength of the IM waveform may be relatively high compared to the quantization noise introduced when decoding the signal, and the UE may configure the ADC with a smaller number of bits compared to decoding OFDM waveforms (e.g., as OFDM waveforms may have a relatively low signal strength compared to quantization noise).

Enhanced signaling and procedures for IM communications may enable a receiving UE to further reduce its ADC resolution and sampling frequency. The UE may identify a quantity of subcarriers from within an allocated bandwidth and transmit a message (e.g., as part of uplink control information (UCI)) to the base station that includes an indication of the quantity of subcarriers. The UE may identify the quantity of subcarriers based on one or more measurements (e.g., a signal-to-quantization-noise ratio (SQNR) measurement, a signal to noise ratio (SNR) measurement) and one or more power consumption factors (e.g., a battery status of the UE, one or more thermal parameters, power consumption allowed by the UE), or any combination thereof. In some examples, the UE may include an indication of the SQNR, SNR, or power consumption factors in the indication of the subcarriers. Additionally, in some cases, the UE may transmit an indication of one or more "blacklisted" subcarriers (e.g., subcarriers the UE may identify for exclusion from an IM waveform) to be excluded from the IM communications. The UE may identify the one or more blacklisted subcarriers based on the signal measurements or one or more spurs identified by the UE.

The base station may receive the preferred subcarrier quantity indication (and, if applicable, the blacklisted subcarrier indication) and may determine a number of active subcarriers from the allocated bandwidth to be used for subsequent IM communications with the UE. The base station may transmit a message (e.g., as part of downlink control information (DCI)) including an indication of the number of active subcarriers. The UE and the base station may then communicate using one or more of the active subcarriers.

Aspects of the disclosure are initially described in the context of wireless communications systems. Aspects of the disclosure are also illustrated by and described with reference to power allocation diagrams and process flows. Aspects of the disclosure are further illustrated by and described with reference to apparatus diagrams, system diagrams, and flowcharts that relate to index modulation for low-power analog-to-digital converters.

FIG. 1 illustrates an example of a wireless communications system 100 that supports index modulation for low-power analog-to-digital converters in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest SNR (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 and a base station 105 may communicate (e.g., via a communication link 125) using IM communications. The UE 115 may identify a quantity of subcarriers from a set of subcarriers of an allocated bandwidth. The quantity of subcarriers may be identified based on an SQNR, an SNR, and one or more power consumption factors of the UE. For example, the UE 115 may identify a quantity of subcarriers such that IM communications using that quantity of subcarriers may increase an SQNR or increase an SNR. Additionally, or alternatively, the UE 115 may identify the quantity of subcarriers such that IM communications using that quantity of subcarriers may reduce power consumption at the UE 115. The UE 115 may transmit, to a base station 105, a message that includes an indication of the quantity of subcarriers. In some cases, the quantity of subcarriers indicated may correspond to a number of subcarriers that may enable increased power consumption efficiency at the UE 115 (e.g., through reduced ADC resolution and/or sampling frequency). Additionally, the UE 115 may identify a set of blacklisted subcarriers and transmit an indication of the set of blacklisted subcarriers to the base station 105, which the base station 105 may exclude from further IM communications.

Upon receiving the message, the base station 105 may determine a number of active subcarriers for subsequent IM communications based on the subcarrier indication and, in some cases, the blacklisted subcarriers. The base station 105 may transmit, to the UE 115, a message including an indication of the quantity of active subcarriers. Additionally, the base station 105 may transmit an acknowledgement that the base station 105 received the indication of the blacklisted subcarriers. In some cases, the acknowledgement may include an indication that the base station 105 has excluded the blacklisted subcarriers. In other cases, the acknowledgement may include a list of subcarriers excluded from further IM communications.

The UE 115 and the base station 105 may communicate based on the quantity of preferred subcarriers and the quantity of active subcarriers. For instance, the UE 115 may process any received index modulated signals based on the quantity of preferred subcarriers indicated by the UE 115. In some examples, the UE 115 may receive the message including the indication of the quantity of active subcarriers and may receive index modulated signals over one or more active subcarriers. In some examples, the UE 115 may configure an ADC of the UE 115 with a resolution size and/or sampling frequency based on the quantity of subcarriers. The resolution size and/or sampling frequency may be reduced compared to OFDM communications. Thus, enhanced signaling of IM communications may enable reduced power consumption at the UE 115, more efficient communications, and overall improved system efficiency.

Figure 2:
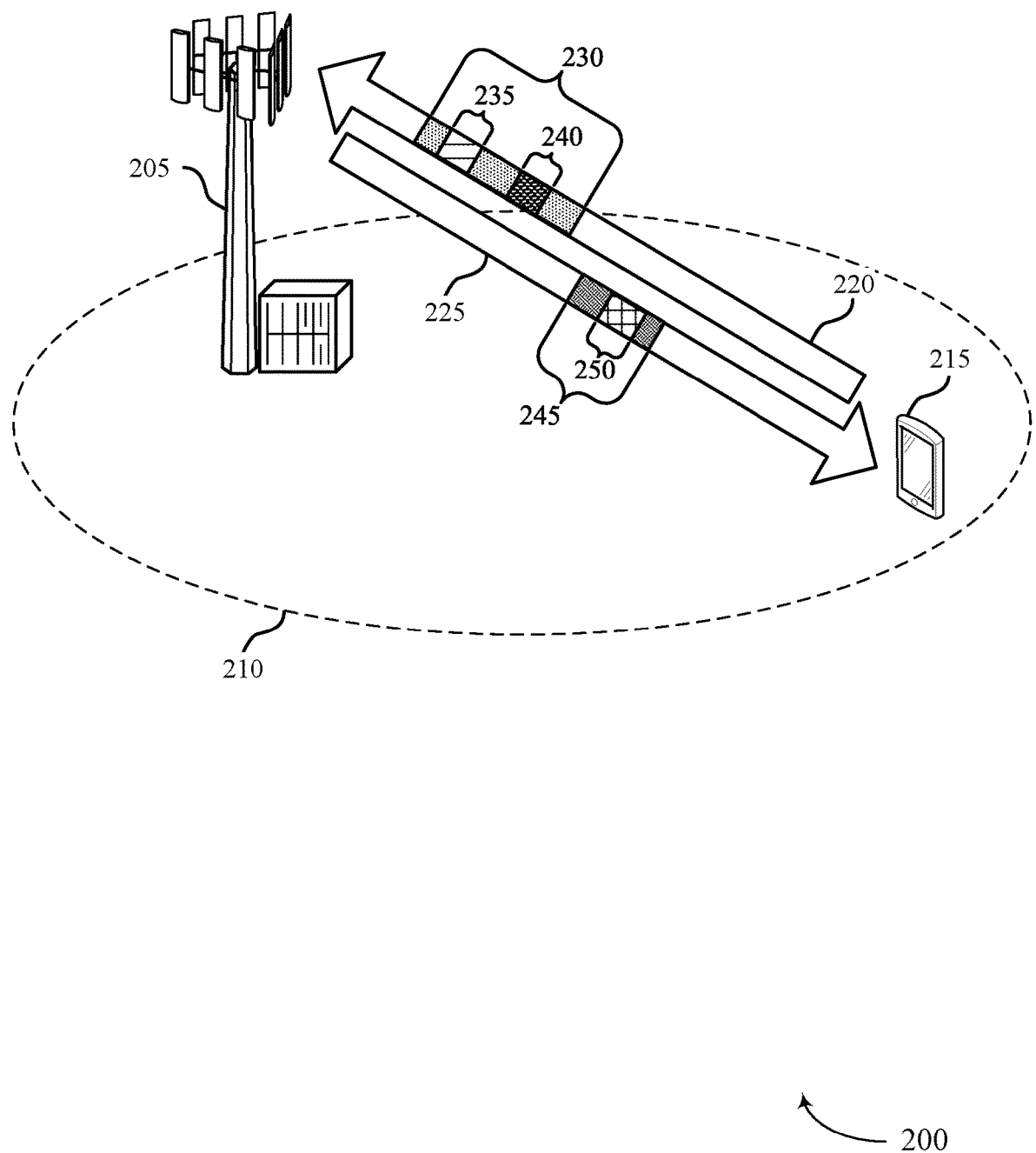
FIG. 2 illustrates an example of a wireless communications system that supports index modulation for low-power ADCs in accordance with aspects of the present disclosure.

FIG. 2 illustrates an example of a wireless communications system 200 that supports index modulation for low-power ADCs in accordance with aspects of the present disclosure. In some examples, wireless communications system 200 may implement aspects of wireless communications system 100. The wireless communications system 200 may include a base station 205 and UE 215, which may be examples of base stations 105 and UEs 115, respectively, as described with reference to FIG. 1. Base station 205 may be an example of a gNB, a central unit (CU), a distributed unit (DU), or the like. UE 215 may be an example of a cell phone, a mobile terminal, or any device supporting UE-like capabilities. UE 215 and base station 205 may be located in a coverage area 210, and may communicate over an uplink 220 and downlink 225.

In some wireless communications systems (e.g., LTE, LTE-U, etc.), the UE 215 and the base station 205 may communicate via uplink 220 and downlink 225 using OFDM communications over a continuous allocated bandwidth. In some cases, the size and frequency range of the allocated bandwidth may constrain the sampling frequency at an ADC of the UE 215. For instance, the base station 205 may send an OFDM waveform over an allocated bandwidth. The UE 215 ADC may use a sampling frequency to decode signals that correspond to the bandwidth. For instance, the sampling frequency may be twice the allocated bandwidth. In systems that support relatively higher carrier frequencies (e.g., such as frequency bands used in systems supporting frequency range 4 (FR4) (e.g., 52.6 GHz-114.25 GHz bands), FR5 (which may be referred to as "upper millimeter wave bands" or a "sub-THz regime), FR6 (e.g., bands up to 3 THz), 5G communications, 6G communications, or the like), the ADC may use higher signal sampling frequencies. ADC power consumption and, consequentially, digital-front-end (DFE) component power consumption may increase as the sampling frequency increases. Thus, if the UE 215 and the base station 205 communicate via OFDM waveforms using higher carrier frequencies and wider bandwidths, the UE 215 may experience greater power consumption and decreased system efficiency.

To mitigate such issues, the UE 215 and the base station 205 may communicate via uplink 220 and downlink 225 using IM communications. In such cases, the UE 215 and the base station 205 may communicate using a number of active subcarriers out of the total number of subcarriers associated with an allocated bandwidth. The number of active subcarriers may be less than or equal to the total number of subcarriers of the allocated bandwidth. Additionally, the UE 215 and the base station 205 may communicate using non-continuous subcarriers. For instance, an allocated bandwidth may have 30 subcarriers indexed incrementally by 1 (e.g., 1, 2, 3, 4, 5, etc.). In OFDM communications, the UE 215 and the base station 205 may communicate using all 30 subcarriers. In IM communications, the UE 215 and the base station 205 may communicate using a set of one or more specified active subcarriers (e.g., 1, 3, 4, 7, 8, 23), where the set may include a number of subcarriers that is less than or equal to the total number of subcarriers (e.g., 30 subcarriers) in the allocated bandwidth.

IM communications may therefore alleviate some restrictions associated with using OFDM waveforms at high frequencies. For instance, the total bandwidth of the active subcarriers used in IM communications may correspond to a smaller bandwidth than the entire allocated bandwidth (e.g., as used in OFDM communications). Thus, if the UE 215 configures the ADC sampling frequency to be twice the allocated bandwidth, the UE 215 may lower the sampling frequency of the ADC when using IM communications. Further, while the total overall transmit power may be the same for both OFDM and IM communications, the transmit power of each active subcarrier in IM communications may be higher than the transmit power of each subcarrier in OFDM communications. Accordingly, the UE 215 may configure the ADC with a lower resolution (as compared to OFDM communications).

To optimize the usage of IM communications and enable enhanced power savings techniques at the UE 215 (e.g., through a configuration of an ADC resolution), the UE 215 and the base station 205 may determine a number (e.g., a quantity) of subcarriers to be used from a total number of subcarriers. The number of subcarriers used may be less than or equal to a total number of subcarriers available, e.g., in an allocated bandwidth. The UE 215 may identify a quantity of subcarriers based on one or more signal measurements, such as a signal quality measurement, an SQNR measurement, an SNR measurement, or the like. For instance, there may be significant self-interference at the UE 215 on some subcarriers. As such, the UE 215 may perform one or more signal measurements to determine which subcarriers may have the best signal quality. Additionally, or alternatively, the UE 215 may determine a quantity of subcarriers that may enable the UE 215 to experience a relative higher SQNR or a relatively higher SNR. The UE 215 may further identify the quantity of subcarriers based on one or more power consumption factors, such as a battery status at the UE 215, one or more thermal parameters, power consumption allowed by the UE 215, or the like. For instance, the UE 215 may have a relatively low battery level, and may determine that a reduced number of subcarriers (e.g., where each subcarrier is associated with a higher transmit power) may enable the UE 215 to operate with relatively reduced power consumption (e.g., at least based on ADC processing of received signal). The UE 215 may transmit a message 230 that includes an indication (e.g., subcarrier quantity indication 235) of the preferred quantity of subcarriers to the base station 205. In some cases, the message 230 may be an example of UCI. The base station 205 may use the subcarrier quantity indication 235 to determine a number of active subcarriers to be used for communicating with the UE 215 and may transmit an indication of the active subcarriers to the UE 215.

The UE 215 may transmit the subcarrier quantity indication 235 as a number of subcarriers. For instance, the UE 215 may determine that six subcarriers may be preferable for subsequent communications. As such, the UE 215 may report the quantity of subcarriers to the base station 205 as the subcarrier quantity indication 235. In some cases, the UE 215 may determine the preferred quantity of subcarriers as a percentage or ratio of active subcarriers (e.g., from a total number of subcarriers within an allocated bandwidth), and the subcarrier quantity indication 235 may thus include an indication of the percentage or ratio of active subcarriers. In some examples, the UE 215 may additionally indicate one or more power consumption factors, including a battery level, thermal constraints, or any combination thereof, to the base station 205. In some examples, the UE 215 may further indicate an SQNR, or SNR, or both, experienced at the UE 215 within the subcarrier quantity indication 235.

In some cases, the UE 215 may identify a set of one or more subcarriers the UE 215 determines to avoid for communications with the base station 205. The subcarriers to avoid may be referred to as "blacklisted" subcarriers, subcarriers to exclude from IM communications, or some other terminology. The blacklisted subcarriers may be identified by the UE 215, and the UE 215 may transmit a blacklisted subcarrier indication 240 to the base station 205. The UE 215 may identify the blacklisted subcarriers based on one or more spurs associated with processing signals at an ADC of the UE 215. The blacklisted subcarrier indication 240 may therefore include a set of one or more subcarriers that the base station 205 may ignore during subsequent active subcarrier determination. In some cases, the blacklisted subcarrier indication 240 may include one or more subcarrier indices corresponding to the blacklisted subcarriers. For example, the UE 215 may identify subcarriers to be excluded (e.g., blacklisted) and the indices corresponding to those subcarriers, and the UE 215 may include the indices in the blacklisted subcarrier indication 240. In some examples, the UE 215 may include the blacklisted subcarrier indication 240 as part of the subcarrier quantity indication 235, within the message 230, as part of a separate message, or any combination thereof.

Upon receiving the message 230 including the subcarrier quantity indication 235 and, in some cases, the blacklisted subcarrier indication 240, the base station 205 may determine a number of active subcarriers to be used for subsequent IM communications with the UE 215. The base station 205 may determine the number of active subcarriers based on the subcarrier quantity indication 235, the blacklisted subcarrier indication 240, one or more power consumption factors of the UE 215, an SQNR and/or SNR of the UE 215, or some combination thereof. The base station 205 may transmit, to the UE 215, a message 245 including an indication of the active subcarriers (e.g., an active subcarrier indication 250). In some examples, the message 245 may be an example of DCI. The active subcarrier indication 250 may include an indication of the quantity of active subcarriers. In some cases, the active subcarrier indication 250 may include an indication of a percentage of active subcarriers. For instance, the base station 205 may indicate the percentage of active subcarriers as the ratio of the active subcarriers to the total number of subcarriers within an allocated bandwidth. Alternatively, the base station 205 may indicate the percentage of active subcarriers as the ratio of the total number of subcarriers within an allocated bandwidth to the number of active subcarriers. In any case, when the number of active subcarriers is known to the UE 215, the decoding process of IM signaling by the UE 215 may be simplified, and detection errors may also be reduced.

The UE 215 and the base station 205 may therefore communicate using IM communications based on the message 230 and the message 245. The base station 205, for example, may transmit one or more index-modulated downlink signals over one or more active subcarriers via downlink 225. The UE 215 may process the one or more index-modulated downlink signals based on the quantity of subcarriers indicated in the subcarrier quantity indication 235. As an example, by knowing the quantity of subcarriers configured by the base station 205, the UE 215 may identify a relatively reduced set of subcarriers over which messages are transmitted by the base station 205. The UE 215 may process the one or more index-modulated downlink signals using an ADC that is configured with a resolution size and/or sampling frequency based on the quantity of subcarriers indicated in the subcarrier quantity indication 235. In some cases, the base station 205 may have determined the quantity of active subcarriers to minimize the bandwidth of the IM communications. As such, the UE 215 may lower its ADC resolution size and/or sampling frequency, which may enable the UE 215 to reduce power consumption.

The UE 215 and the base station 205 may transmit the message 230 and the message 245, respectively, periodically, semi-persistently, aperiodically, or on-demand (e.g., by request). In some examples, the message 230 may be transmitted by the UE 215 and received by the base station 205 with a first periodicity, and the message 245 may be transmitted by the base station 205 and received by the UE 215 with a second periodicity different from the first periodicity. For example, the base station 205 may transmit the message 245 once every time period (e.g., every slot or other TTI), where the UE 215 may be able to identify the number of subcarriers to expect in each time period (e.g., based on receiving the message 245). In such cases, the transmission of message 230 by the UE 215 may be less frequent (e.g., some multiple of the time period), which may be based on how often the UE 215 determines SNR, SQNR, subcarriers to blacklist, or the like. In some cases, the message 245 and the index modulated signal may be transmitted by the base station (e.g., and received by the UE 215) within a same time period.

Figure 3A:
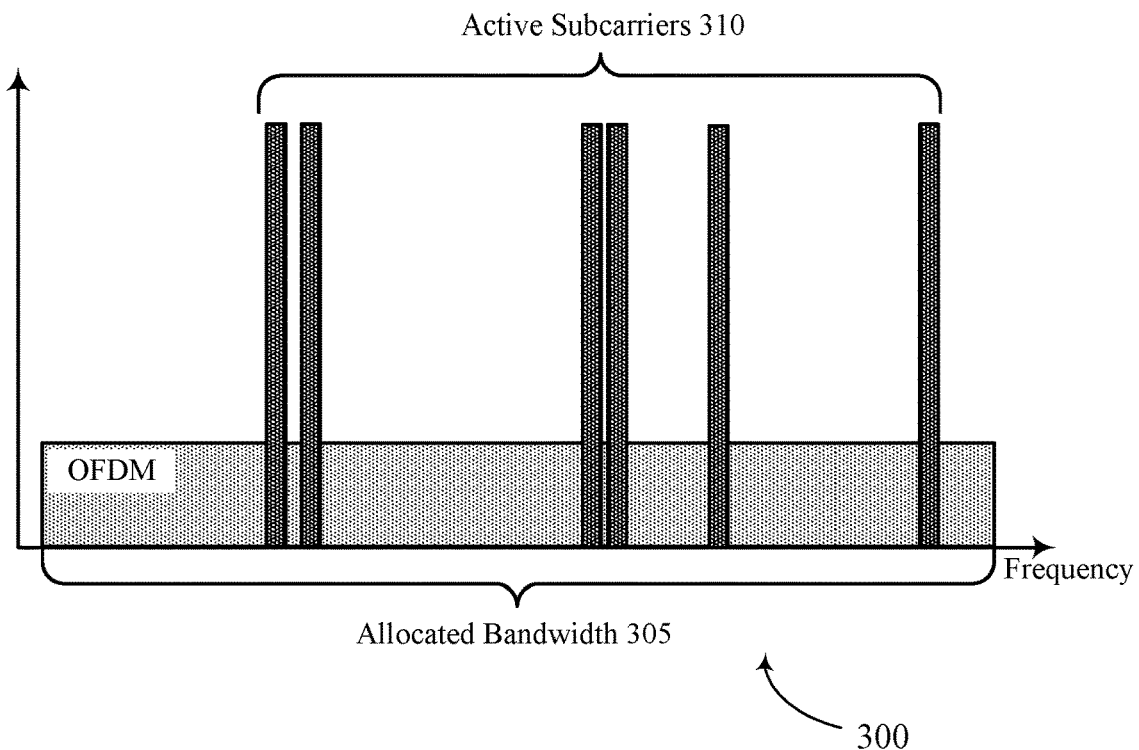
FIGS. 3A and 3B illustrate examples of subcarrier diagrams that support index modulation for low-power ADCs in accordance with aspects of the present disclosure.

FIG. 3A illustrates an example of a subcarrier diagram 300 that supports index modulation for low-power ADCs in accordance with aspects of the present disclosure. A base station or a UE (e.g., as described with reference to FIGS. 1 and 2) may transmit one or more waveforms over one or more subcarriers within an allocated bandwidth 305 as described herein. FIG. 3A may not be shown to scale to allow for clearer illustration and description; power levels and/or frequency durations may be relatively smaller (or larger) than shown. In some examples, subcarrier diagram 300 may implement aspects of wireless communications systems 100 or 200. For instance, a base station 205 may transmit over one or more subcarriers 310 of an allocated bandwidth 305 as described with reference to FIG. 2. In addition, a UE 215 may indicate a number of subcarriers for IM communications with the base station.

A UE and a base station may communicate with one another via one or more subcarriers over an allocated bandwidth 305. In some examples, the allocated bandwidth 305 may include one or more subcarriers according to some subcarrier spacing, a number of subcarriers, or the like. The allocated bandwidth 305 may correspond to a certain frequency range. Additionally, or alternatively, the allocated bandwidth 305 may have a pre-determined size. As an example, the allocated bandwidth 305 may span between 5 MHz and 100 MHz (or more, such as 400 MHz) in the frequency domain. Further, waveforms transmitted using the allocated bandwidth 305 may correspond to a particular output power or output power range. In some cases, the output power may be pre-defined, determined using a loop power control method, or the like.

In some cases, the UE and the base station may communicate via OFDM waveforms where the OFDM waveforms span the entire frequency range of the allocated bandwidth 305 and where the corresponding subcarriers are continuous. In some examples, the size of the allocated bandwidth may constrain the sampling frequency of an ADC of the device which receives the OFDM waveform. For example, a receiving UE may receive an OFDM waveform where the allocated bandwidth spans some bandwidth. The UE may configure its ADC with a sampling frequency of twice the allocated bandwidth. In systems that support relatively higher carrier frequencies and bandwidths (e.g., such as frequency bands used in systems supporting frequency range 4 (FR4) (e.g., 52.6 GHz-114.25 GHz bands), FR5 (which may be referred to as "upper millimeter wave bands" or a "sub-THz regime), FR6 (e.g., bands up to 3 THz), 5G communications, 6G communications, or the like), the ADC may use higher sampling frequencies. As ADC power consumption increases linearly with sampling frequency, communicating with OFDM waveforms at higher carrier frequencies may result in greater power consumption at the receiving device and decreased system efficiency.

Alternatively, the UE and the base station may communicate via IM waveforms. Compared to OFDM waveforms, communicating via IM waveforms may enable the UE and the base station to transmit and receive signals with one or more active subcarriers 310 from a set of subcarriers corresponding to an allocated bandwidth 305. In some cases, the active subcarriers 310 may be non-continuous. For instance, if the UE and the base station communicate with OFDM waveforms, they may transmit and receive signals over a set of continuous subcarriers (e.g., subcarriers indexed 1, 2, 3, 4, 5) whereas if the UE and the base station communicate with IM waveforms, they may transmit and receive signals over a set of non-continuous active subcarriers (e.g., active subcarriers 310 indexed 1, 3, 5, 7, 15, or the like).

Communicating with IM waveforms may alleviate sampling frequency restrictions introduced by communicating with OFDM waveforms. For example, the set of active subcarriers 310 may span a frequency range that is less than or equal to that of the allocated bandwidth 305. As such, a device receiving an IM waveform may configure its ADC with a sampling frequency of twice the allocated bandwidth, where the allocated bandwidth corresponds to the total bandwidth of the active subcarriers 310. That is, the set of active subcarriers 310 may have an aggregate bandwidth that is less than that of the allocated bandwidth 305, and the sampling frequency of the ADC may correspond to the aggregate bandwidth. Therefore, a device receiving an IM waveform may use a lower sampling frequency than if it were to receive an OFDM waveform. Consequentially, using IM waveforms may result in less battery power consumption at the receiving device along with enhanced system efficiency.

Moreover, compared to OFDM waveforms, communications with IM waveforms may result in a smaller decoding error rate. In some cases, a transmitting device may transmit an OFDM waveform with a total output power such that each subcarrier is transmitted with relatively equal output power. For instance, a base station may transmit an OFDM waveform where each subcarrier of the allocated bandwidth 305 is transmitted with the same output power. A receiving device may decode the OFDM waveform using its ADC. The ADC may quantize the signal into discrete voltages, where the resolution of the decoded signal relies on the number of bits the ADC supports. Quantization of an analog signal (e.g., the OFDM waveform) may introduce quantization noise (e.g., deviations of the decoded signal from the original signal). An SQNR may represent the power of the original signal to the respective quantization noise. Generally, if a transmitting device transmits a signal with a relatively high power, the quantization noise may be negligible compared to the signal strength, and thus the decoding error may be relatively low. However, in some OFDM waveform transmissions, the total output power may be distributed over the entire allocated bandwidth 305. This may result in each OFDM subcarrier within the allocated bandwidth 305 having a relatively low output power. Thus, OFDM waveforms may have relatively low SQNR values and thus higher decoding error rates.

Alternatively, the transmitting device may transmit an IM waveform with the same total output power as an OFDM waveform. Due to IM communications using fewer active subcarriers 310 than OFDM communications, the transmitting device may transmit the IM waveform where each active subcarrier 310 is transmitted with a higher output power compared to each subcarrier of the OFDM waveform (e.g., within the allocated bandwidth 305). So, if a receiving device uses the same ADC resolution size to decode the IM waveform, the SQNR of the IM waveform may be greater than that of the OFDM waveform. In particular, assuming the same sampling frequency when decoding the OFDM waveform and the IM waveform, the SQNR of the IM waveform may be greater by a factor of $$R_a = \frac{N_{Allocated}^{SC}}{N_{Active}^{SC}},$$

where $R_a$ may be the subcarrier ratio, $N_{Allocated}^{SC}$ may be the total number of subcarriers in the allocated bandwidth, and $N_{Active}^{SC}$ may be the number of active IM subcarriers. In such cases, the receiving device may reduce the ADC resolution size due to the oversampling of the IM waveform, resulting in a reduced power consumption at the receiving device. In some examples, the receiving device may oversample the active subcarriers by a relatively higher rate with IM communications (as compared to OFDM communications), which may result in the flexibility to reduce the resolution of an ADC. That is, when using a same sampling rate for both IM and OFDM communications, a substantially same SNR may be achieved for IM communications while also reducing an ADC resolution, enabling enhanced power savings at the receiving device (as compared to OFDM communications).

Accordingly, a device, such as a UE, may determine a preferred quantity of subcarriers (e.g., active subcarriers 310) to be used for IM communications (e.g., with another device, such as a base station). The preferred quantity of subcarriers may be determined based on an SQNR, an SNR, and one or more power consumption factors. The UE may indicate the preferred quantity of subcarriers to the base station. In response, the base station may determine a quantity of active subcarriers 310 to be used for the IM communications with the UE. The base station may indicate the quantity of active subcarriers 310 to the UE. In some cases, the base station may also transmit an index modulated signal (e.g., a downlink signal) to the UE (e.g., over one or more active subcarriers 310). The UE may process the index modulated signal, e.g., using an ADC configured with a resolution size and/or sampling frequency based on the preferred quantity of subcarriers, the quantity of active subcarriers 310, or both.

Figure 3B:
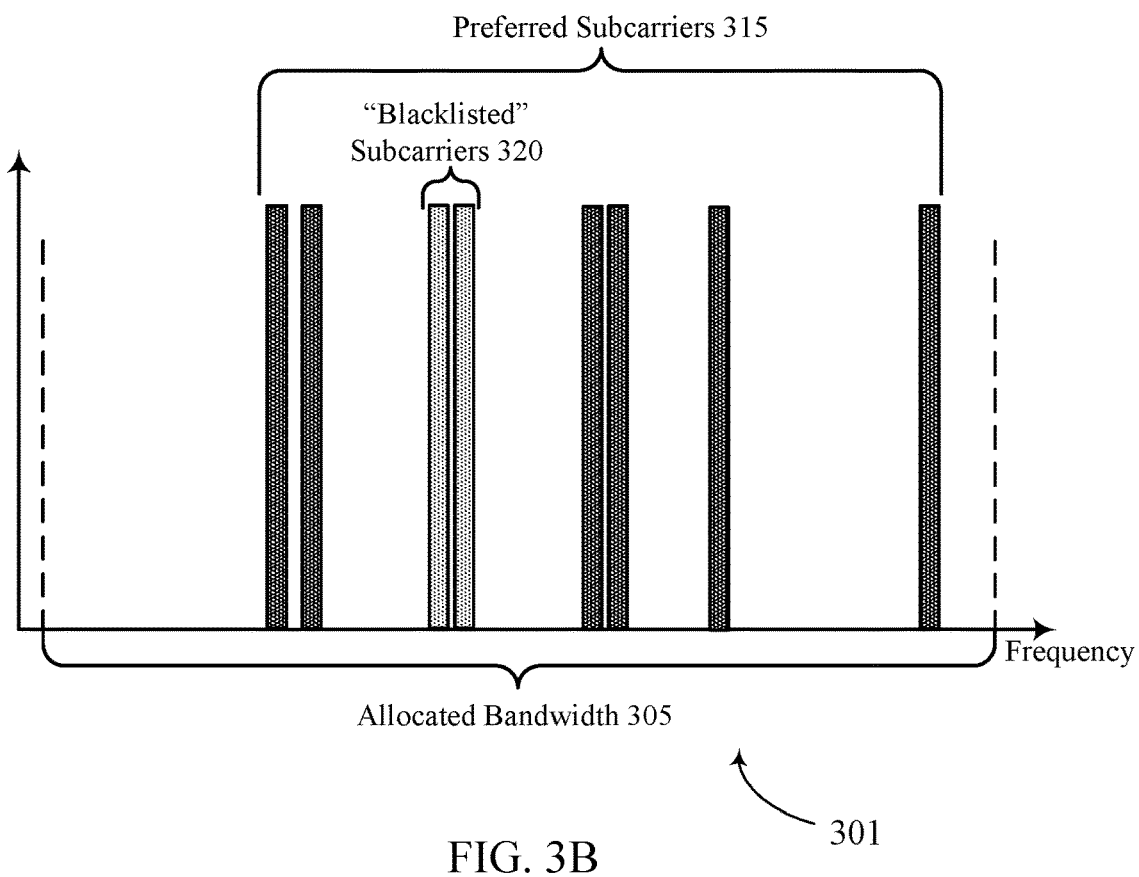

FIG. 3B illustrates an example of a subcarrier diagram 301 that supports index modulation for low-power ADCs in accordance with aspects of the present disclosure. A base station or a UE (e.g., as described with reference to FIGS. 1 and 2) may transmit one or more waveforms over one or more subcarriers within an allocated bandwidth 305 as described herein. FIG. 3B may not be shown to scale to allow for clearer illustration and description; power levels and/or frequency durations may be relatively smaller (or larger) than shown. In some examples, subcarrier diagram 301 may implement aspects of wireless communications systems 100 or 200. For instance, a UE 215, as described with reference to FIG. 2, may transmit a message indicating a number of preferred subcarriers or one or more blacklisted subcarriers 320 that are within the allocated bandwidth 305.

As described herein, a UE may transmit a message to a base station including an indication of a preferred quantity of subcarriers 315 and an indication of one or more blacklisted subcarriers 320. For example, the UE may identify the quantity of the subcarriers 315 based on one or more signal measurements and one or more power consumption factors and may transmit an indication of the quantity of the subcarriers 315 to the base station. In some examples, the UE may denote the quantity of subcarriers 315 within the subcarrier indication as a number of subcarriers 315. For instance, the UE may indicate six preferred subcarriers 315. In such cases, the UE may indicate that the preferred quantity of subcarriers is six. In other examples, the UE may denote the quantity of subcarriers 315 as the percentage of subcarriers out of a total number of subcarriers 315 within the allocated bandwidth 305. For instance, the UE may indicate the quantity of subcarriers as 20 percent of 30 total subcarriers (e.g., 6/30 subcarriers) of the allocated bandwidth. The quantity of subcarriers may be indicated in other ways (e.g., as a ratio, a count, a number, a list, an approximation, or the like) and the examples provided herein are for illustrative purposes and should not be considered to be limiting.

The UE may identify the one or more blacklisted subcarriers 320 based on one or more spurs associated with processing signals using an ADC. A spur may introduce interference at the UE on some subcarriers, and the UE may determine to blacklist the subcarrier(s) to avoid such interference. For example, if a signal quality measurement for a subcarrier within the allocated bandwidth 305 satisfies a threshold value, the UE may determine that the subcarrier may provide poor performance and increased interference, and may identify the subcarrier as a blacklisted subcarrier. The blacklist subcarrier threshold value may be indicated by the base station, predefined by the UE, autonomously determined at the UE, or the like. The UE may indicate the blacklisted subcarriers 320 such that the base station may ignore any blacklisted subcarriers 320 when determining active subcarriers to be used in subsequent communications. For instance, the UE may indicate the blacklisted subcarriers 320 as a list of subcarriers, a table of subcarriers, a set of subcarrier indices corresponding to the blacklisted subcarriers 320, or the like.

When the base station receives the subcarrier quantity indication (and, in some cases, the backlisted subcarrier indication) from the UE, the base station may optimize active subcarriers for subsequent communications with the UE. The active subcarriers may be the active subcarriers 310 as described with reference to FIG. 3A. The base station may, for example, configure the number of active subcarriers based on the subcarrier quantity indication, the blacklisted subcarriers 320, one or more power consumption factors (e.g., as indicated by the UE), or the like. The base station may transmit a message to the UE including an indication of the quantity of active subcarriers. In some cases, the base station may indicate the quantity active subcarriers as the number of active subcarriers. In the example of FIG. 3A, the base station may indicate that there are 6 active subcarriers 310. Alternatively, the base station may indicate the quantity of active subcarriers as a percentage of active subcarriers. For instance, the base station may indicate the percentage of active subcarriers as the ratio of the active subcarriers to the total number of subcarriers within the allocated bandwidth 305. Alternatively, the base station may indicate the percentage of active subcarriers as the ratio of the total number of subcarriers within an allocated bandwidth 305 to the number of active subcarriers (e.g., the ratio $R_a$ as described with reference to FIG. 3A). The UE may receive the indication of the active subcarriers and process (e.g., using an ADC) one or more index modulated downlink signals according to the active subcarriers for subsequent IM communications with the base station.

Signaling of IM subcarriers may allow the base station to optimize the communications between the base station and the UE. This may compound on the benefits of using IM communications to decrease the UE ADC sampling frequency, allowing the UE to further decrease its battery power consumption, resulting in enhanced system efficiency.

Figure 4:
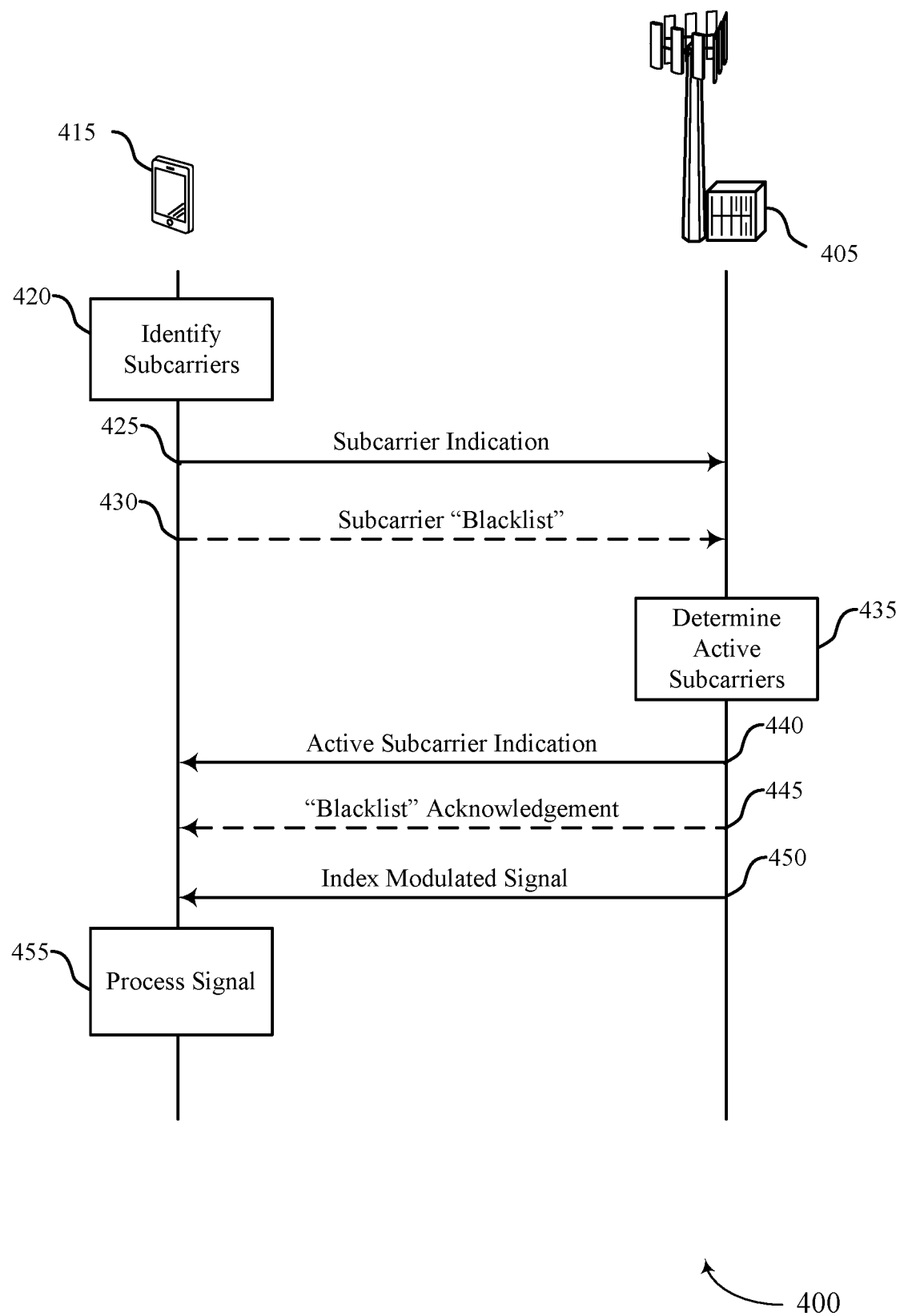
FIG. 4 illustrates an example of a process flow that supports index modulation for low-power ADCs in accordance with aspects of the present disclosure.

FIG. 4 illustrates an example of a process flow 400 that supports index modulation for low-power ADCs in accordance with aspects of the present disclosure. In some examples, the process flow 400 may implement aspects of the wireless communications systems 100 or 200 and the subcarrier diagrams 300 and 301 as described with reference to FIGS. 1 through 3, respectively. The process flow 400 shows an example of communications between a UE 415 and a base station 405, which may be examples of corresponding devices described herein. Alternative examples of the following may be implemented, where some steps are performed in a different order than described or are not performed at all. In some cases, steps may include additional features not mentioned below, or further steps may be included.

In some cases, UE 415 and base station 405 may communicate with one another using IM communications. As such, both the UE 415 and the base station 405 may transmit and receive IM signals over one or more active subcarriers within an allocated bandwidth.

At 420, the UE 415 may identify a quantity of subcarriers from a multitude of subcarriers within a bandwidth (e.g., such as an allocated bandwidth 305 as described with reference to FIG. 3) to use for IM communications. In some cases, the UE 415 may identify the quantity of subcarriers based on an SQNR measurement, an SNR measurement, or the like. For example, the UE 415 may identify a number of subcarriers that correspond to an SQNR that satisfies a threshold value. The threshold value may be predefined at the UE 415, autonomously determined, signaled from the base station 405, or the like. Additionally, or alternatively, the UE 415 may identify a quantity of subcarriers based on one or more power consumption factors. Power consumption factors may include a battery status of the UE 415, one or more thermal parameters, power consumption allowed by the UE 415, or any combination thereof. For instance, the UE 415 may identify a quantity of subcarriers based on the UE 415 having a relatively low battery power, where the quantity of subcarriers enables the UE 415 to conserve power and reduce power consumption. In some examples, the UE 415 may identify the quantity of subcarriers by identifying a percentage of active subcarriers from the total number of subcarriers within the bandwidth. For instance, if the total number of subcarriers within the bandwidth is 30 and the number of active subcarriers is 6, the UE 415 may identify the quantity of subcarriers based on the appropriate percentage (e.g., 20 percent). The active subcarriers may be an example of the active subcarriers 315 as described with reference to FIG. 3.

In some cases, at 420, the UE 415 may also identify a set of one or more subcarriers to be excluded (e.g., blacklisted) from the IM communications. The set of one or more subcarriers to be excluded from the IM communications may be an example of the blacklisted subcarriers 320 as described with reference to FIG. 3. The UE 415 may identify the set of subcarriers to be excluded from IM communications based on one or more spurs associated with processing downlink signals using an ADC of the UE 415. As an example, the UE 415 may monitor a set of 30 subcarriers corresponding to the allocated bandwidth. If the UE 415 identifies that one or more subcarriers of the set of 30 subcarriers is subject to significant interference, the UE 415 may identify the subcarriers subject to significant interference as blacklisted subcarriers. The UE 415 may determine whether the one or more subcarriers is subject to interference based on whether interference measurements corresponding to the subcarriers satisfy a given threshold value. In some examples, the UE 415 may identify the subcarrier indices corresponding to the blacklisted subcarriers.

At 425, the UE 415 may transmit a first message including an indication of the quantity of subcarriers to the base station 405. In some cases, the message may be UCI. In some examples, the UE 415 may include an indication of the percentage of subcarriers as the indication of the quantity of subcarriers. In some examples, the UE 415 may include indications of one or more signal measurements as well as one or more power consumption factors within the first message. The UE 415 may transmit the first message according to a first periodicity. The first periodicity may be predefined at the UE 415, autonomously determined, signaled from the base station 405, or the like.

At 430, the UE 415 may transmit, to the base station 405, an indication of the set of one or more subcarriers to be excluded (e.g., blacklisted) from the IM communications to the base station 405. In some examples, the UE 415 may include the indices of the blacklisted subcarriers within the indication of the set of one or more subcarriers to be excluded from the IM communications. Alternatively, the UE 415 may include the indication of the set of one or more subcarriers to be excluded from the index modulated communications in the first message transmitted at 425.

At 435, upon receiving one or more of the indication of the quantity of subcarriers and the set of one or more subcarriers to be excluded from the IM communications, the base station 405 may determine a quantity of active subcarriers. The base station 405 may determine the quantity of active subcarriers based on the indication of the quantity of subcarriers received at 425. For instance, if the base station 405 identifies that the quantity of subcarriers indicated is six (or a corresponding percentage of subcarriers), the base station 405 may select six active subcarriers for subsequent index modulated communications (e.g., to support power savings and efficiency at the UE 415, where the UE 415 may (dynamically) configure its ADC based on the number of active subcarriers, such as by reducing an ADC resolution). In some examples, the base station 405 may ignore the one or more blacklisted subcarriers as indicated by the UE 415. Additionally, or alternatively, the base station 405 may determine the quantity of active subcarriers based on the UE 415 signal measurements and power consumption factors. For instance, if the UE 415 indicates that it is in a low-power mode and that the SQNR for one or more subcarriers satisfies a threshold value, the base station 405 may determine the quantity of active subcarriers to minimize the active subcarrier bandwidth, minimize the frequency range of the allocated bandwidth, or the like.

At 440, the base station 405 may transmit, to the UE 415, a second message including an indication of the quantity of active subcarriers. In some examples, the base station 405 may transmit the second message in DCI. The base station 405 may transmit the second message according to a second periodicity that is different from the first periodicity. The second periodicity may be predefined at the base station 405, autonomously determined, signaled from a parent node, or the like. In some cases, the base station 405 may include the percentage of active subcarriers compared to the total number of number of subcarriers of the bandwidth within the indication of the quantity of active subcarriers. For example, if the number of active subcarriers is 6 and the total number of subcarriers of the bandwidth is 30, the base station 405 may include the corresponding percentage in the active subcarrier indication (e.g., 20 percent).

At 445, the base station 405 may transmit, to the UE 415, a message including an acknowledgement that the base station 405 has received the subcarrier blacklist indication (e.g., transmitted by the UE 415 at 430). The message may include an indication that the base station 405 has excluded the set of one or more subcarriers indicated at 430 from IM communications. Additionally or alternatively, the message may include a list of subcarriers that the base station 405 has excluded from IM communications, e.g., if the list of subcarriers is different from the set of subcarriers indicated at 430. For example, the base station 405 may have excluded a set of subcarriers different from the set of subcarriers indicated at 430, the base station 405 may have excluded a portion of the set of subcarriers indicated at 430, the base station may have excluded other subcarriers in addition to the set of subcarriers indicated at 430, or the like.

At 450, the base station 405 may transmit an IM signal to the UE 415 over one or more of the active subcarriers determined at 435. In some cases, the base station 405 may transmit both the second message at 440 and the index modulated signal at 450 within a same time period.

At 455, the UE 415 may process the IM signal received at 450 based on the quantity of subcarriers and the active subcarrier indication from the second message received at 440. The UE 415 may process the IM signal using an ADC, where the UE 415 may configure the ADC with a resolution size based on the quantity of subcarriers, the active subcarrier indication, or any combination thereof.

Improving the control signaling between the UE 415 and the base station 405 communicating with IM waveforms may allow the UE 415 to lower the ADC resolution, resulting in more efficient power usage at the UE 415, improved communication efficiency, and enhanced overall system performance.

Figure 5:
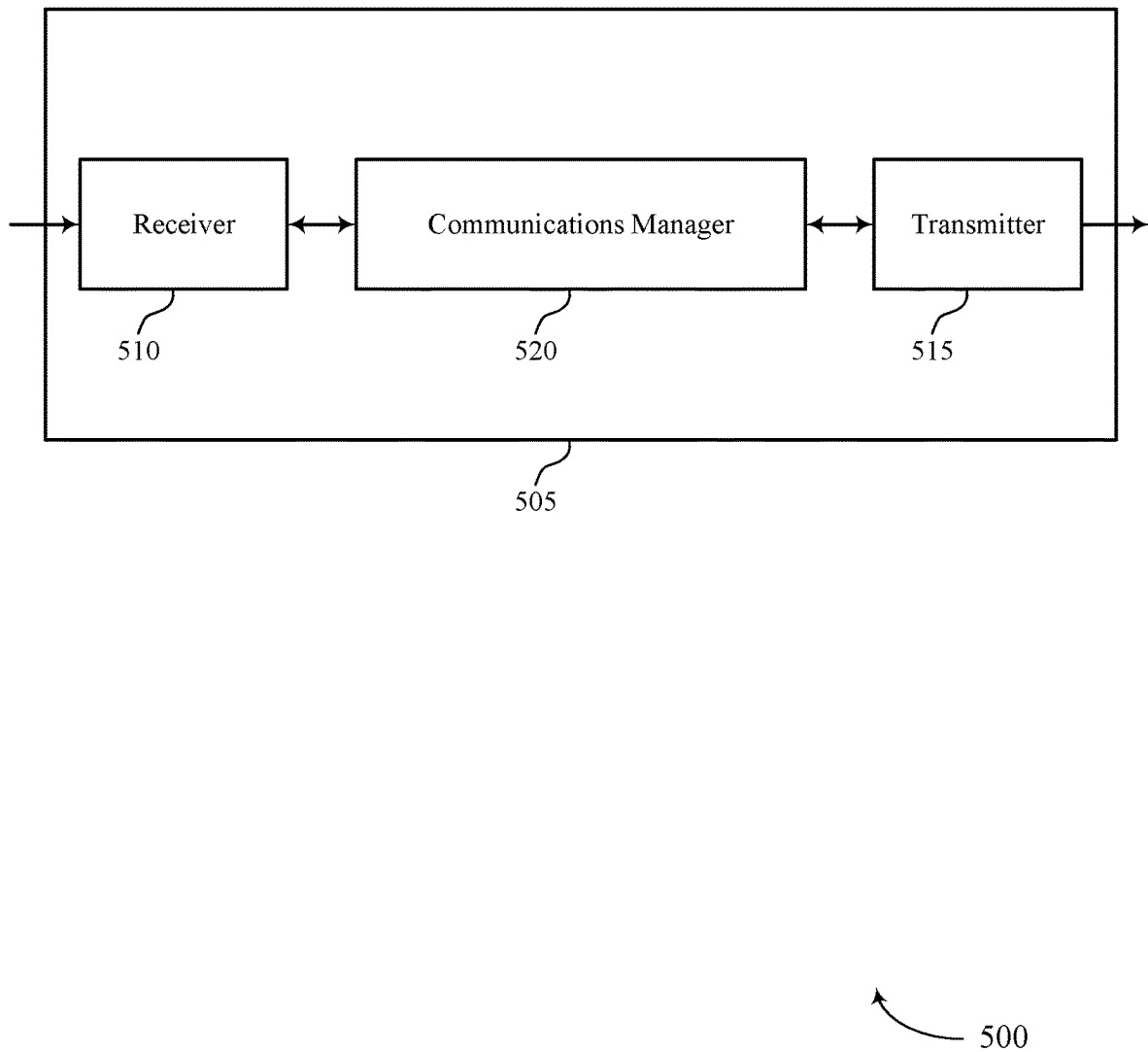
FIGS. 5 and 6 show block diagrams of devices that support index modulation for low-power ADCs in accordance with aspects of the present disclosure.

FIG. 5 shows a block diagram 500 of a device 505 that supports index modulation for low-power ADCs in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to index modulation for low-power ADCs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to index modulation for low-power ADCs). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of index modulation for low-power ADCs as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for identifying, from a set of multiple subcarriers within a bandwidth, a quantity of subcarriers for index modulated communications, the quantity of subcarriers being identified based on a signal-to-quantization-noise ratio, an SNR, and one or more power consumption factors of the UE. The communications manager 520 may be configured as or otherwise support a means for transmitting, to a base station, a message including an indication of the quantity of subcarriers. The communications manager 520 may be configured as or otherwise support a means for processing an index modulated downlink signal based on the quantity of subcarriers.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for optimized index modulation communications at the device 505. For example, by communicating only on a number of active subcarriers of an allocated bandwidth, the device 505 may reduce the sampling frequency of an ADC of the device 505 (e.g., as the aggregated bandwidth of the active subcarriers may be less than the allocated bandwidth). Additionally, due to the increased transmit power of the active subcarriers (e.g., as compared to the transmit power of an equivalent bandwidth), the device 505 may reduce the resolution size of the ADC. Reducing the sampling frequency and resolution size of the ADC may result in reduced power consumption and increased system efficiency at the device 505.

Figure 6:
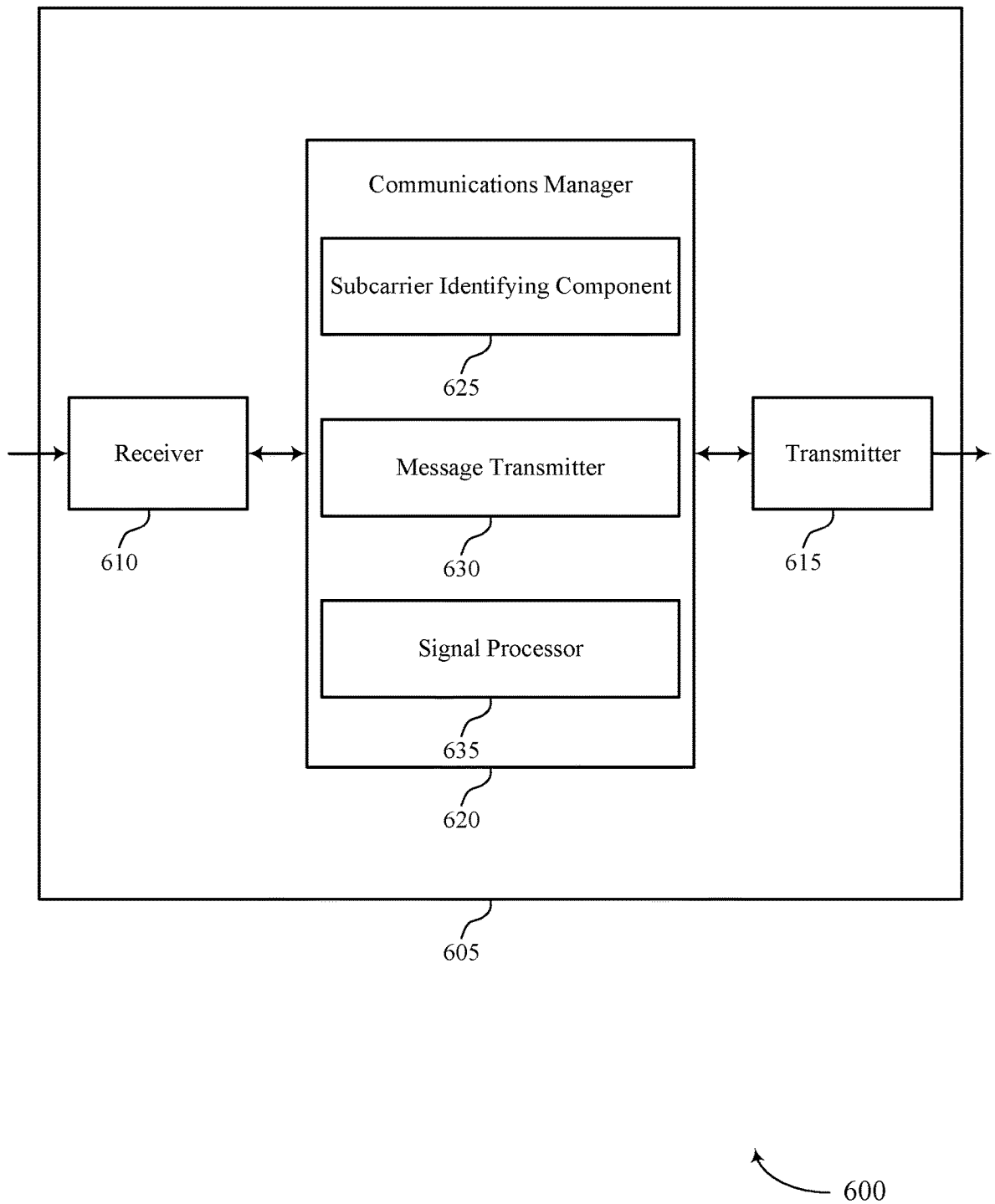

FIG. 6 shows a block diagram 600 of a device 605 that supports index modulation for low-power ADCs in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to index modulation for low-power ADCs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to index modulation for low-power ADCs). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of index modulation for low-power ADCs as described herein. For example, the communications manager 620 may include a subcarrier identifying component 625, a message transmitter 630, a signal processor 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The subcarrier identifying component 625 may be configured as or otherwise support a means for identifying, from a set of multiple subcarriers within a bandwidth, a quantity of subcarriers for index modulated communications, the quantity of subcarriers being identified based on an SQNR, an SNR, one or more power consumption factors of the UE, or any combination thereof. The message transmitter 630 may be configured as or otherwise support a means for transmitting, to a base station, a message including an indication of the quantity of subcarriers. The signal processor 635 may be configured as or otherwise support a means for processing an index modulated downlink signal based on the quantity of subcarriers.

Figure 7:
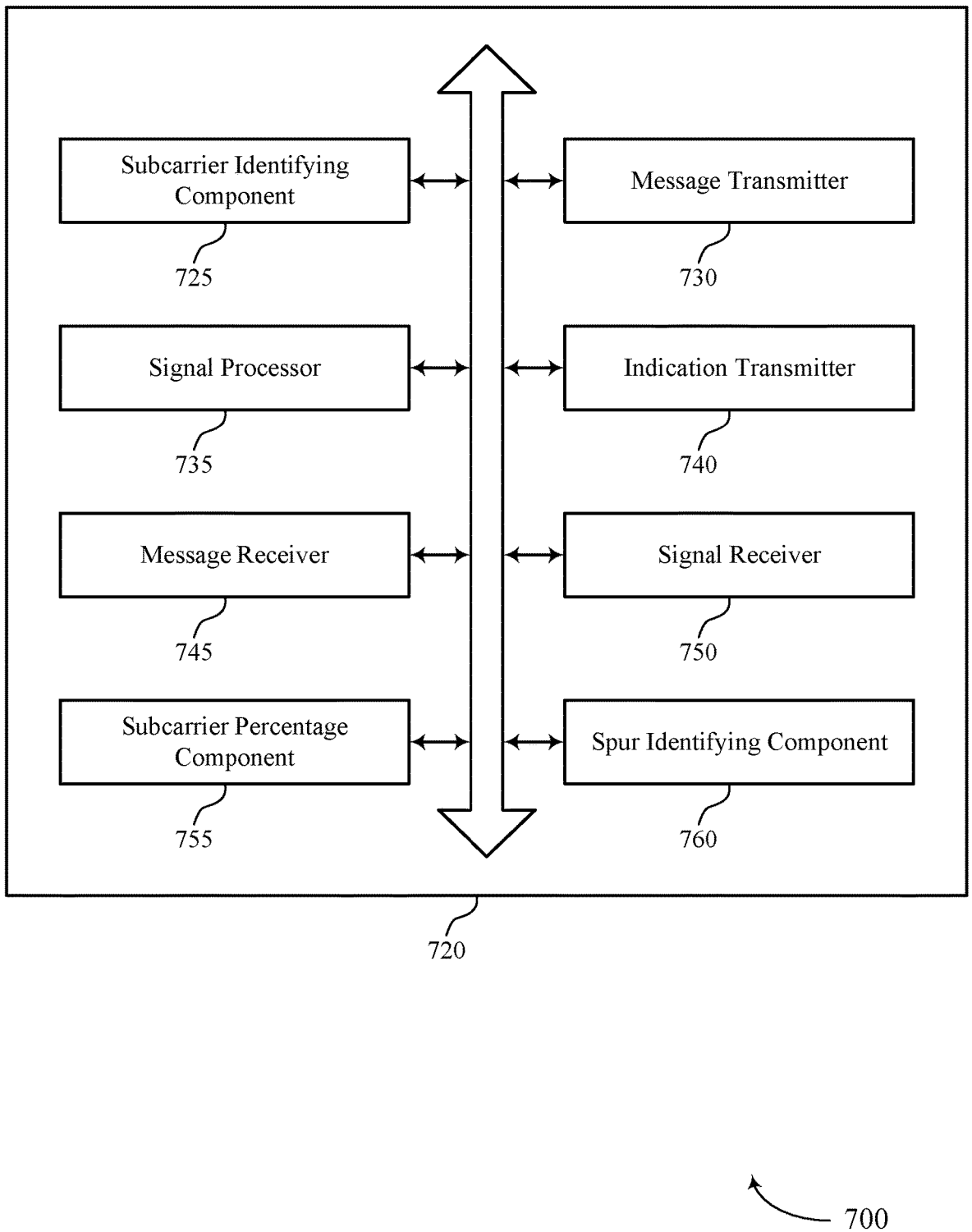
FIG. 7 shows a block diagram of a communications manager that supports index modulation for low-power ADCs in accordance with aspects of the present disclosure.

FIG. 7 shows a block diagram 700 of a communications manager 720 that supports index modulation for low-power ADCs in accordance with aspects of the present disclosure. The communications manager 720 may be an example of aspects of a communications manager 520, a communications manager 620, or both, as described herein. The communications manager 720, or various components thereof, may be an example of means for performing various aspects of index modulation for low-power ADCs as described herein. For example, the communications manager 720 may include a subcarrier identifying component 725, a message transmitter 730, a signal processor 735, an indication transmitter 740, a message receiver 745, a signal receiver 750, a subcarrier percentage component 755, a spur identifying component 760, or any combination thereof. Each of these components may communicate, directly or indirectly, with one another (e.g., via one or more buses).

The communications manager 720 may support wireless communication at a UE in accordance with examples as disclosed herein. The subcarrier identifying component 725 may be configured as or otherwise support a means for identifying, from a set of multiple subcarriers within a bandwidth, a quantity of subcarriers for index modulated communications, the quantity of subcarriers being identified based on an SQNR, an SNR, one or more power consumption factors of the UE, or any combination thereof. The message transmitter 730 may be configured as or otherwise support a means for transmitting, to a base station, a message including an indication of the quantity of subcarriers. The signal processor 735 may be configured as or otherwise support a means for processing an index modulated downlink signal based on the quantity of subcarriers.

In some examples, the subcarrier identifying component 725 may be configured as or otherwise support a means for identifying, from the set of multiple subcarriers within the bandwidth, a set of one or more subcarriers to be excluded from the index modulated communications. In some examples, the indication transmitter 740 may be configured as or otherwise support a means for transmitting, to the base station, an indication of the set of one or more subcarriers.

In some examples, the subcarrier identifying component 725 may be configured as or otherwise support a means for identifying one or more subcarrier indices corresponding to the set of one or more subcarriers, where the indication of the set of one or more subcarriers includes the one or more subcarrier indices.

In some examples, the spur identifying component 760 may be configured as or otherwise support a means for identifying one or more spurs associated with processing signals using an ADC of the UE, where the set of one or more subcarriers to be excluded from the index modulated communications is based on the one or more spurs. In some examples, the indication of the set of one or more subcarriers is transmitted within the message.

In some examples, the message receiver 745 may be configured as or otherwise support a means for receiving, from the base station, a second message including an acknowledgement that of the set of one or more subcarriers to be excluded. In some examples, the second message includes an indication that the set of one or more subcarriers is excluded from the index modulated communications or a list of subcarriers that are excluded from the index modulated communications.

In some examples, the message receiver 745 may be configured as or otherwise support a means for receiving, from the base station, a third message including an indication of a quantity of active subcarriers for the index modulated communications, the quantity of active subcarriers being based on the indication of the quantity of subcarriers. In some examples, the signal receiver 750 may be configured as or otherwise support a means for receiving the index modulated downlink signal over one or more active subcarriers.

In some examples, the message including the indication of the quantity of subcarriers is transmitted with a first periodicity. In some examples, the third message indicating the quantity of active subcarriers is received with a second periodicity different from the first periodicity.

In some examples, the third message and the index modulated downlink signal are received within a same time period.

In some examples, the third message includes downlink control information. In some examples, the message includes uplink control information.

In some examples, to support processing the index modulated downlink signal, the signal processor 735 may be configured as or otherwise support a means for processing the index modulated downlink signal using an ADC, the ADC being configured with a resolution size based on the quantity of subcarriers.

In some examples, to support identifying the quantity of subcarriers, the subcarrier percentage component 755 may be configured as or otherwise support a means for determining a percentage of active subcarriers from the set of multiple subcarriers, where the indication of the quantity of subcarriers includes an indication of the percentage of active subcarriers.

In some examples, the one or more power consumption factors include a battery status of the UE, one or more thermal parameters, power consumption allowed by the UE, or any combination thereof.

Figure 8:
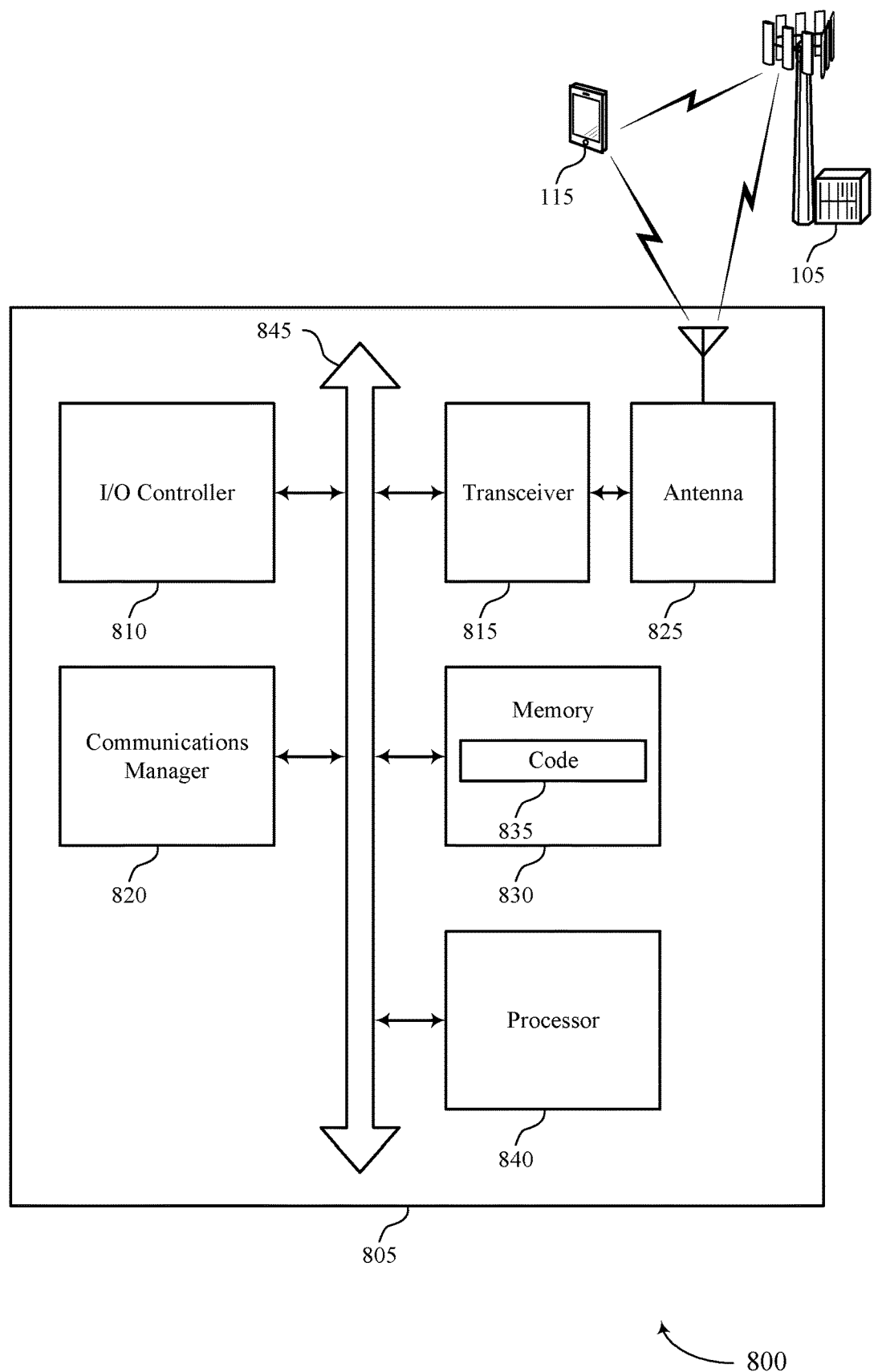
FIG. 8 shows a diagram of a system including a device that supports index modulation for low-power ADCs in accordance with aspects of the present disclosure.

FIG. 8 shows a diagram of a system 800 including a device 805 that supports index modulation for low-power ADCs in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting index modulation for low-power ADCs). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for identifying, from a set of multiple subcarriers within a bandwidth, a quantity of subcarriers for index modulated communications, the quantity of subcarriers being identified based on an SQNR, an SNR, one or more power consumption factors of the UE, or any combination thereof. The communications manager 820 may be configured as or otherwise support a means for transmitting, to a base station, a message including an indication of the quantity of subcarriers. The communications manager 820 may be configured as or otherwise support a means for processing an index modulated downlink signal based on the quantity of subcarriers.

By including or configuring the communications manager 820 in accordance with examples as described herein, the device 805 may support techniques for improved IM communications. For example, by communicating on a number of active subcarriers of an allocated bandwidth, the device 805 may increase the transmit power of each active subcarrier. An increased transmit power may result in a higher SQNR and/or a higher SNR for signals transmitted on the active subcarriers, which may in turn increase communications reliability and system efficiency.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of index modulation for low-power ADCs as described herein, or the processor 840 and the memory 830 may be otherwise configured to perform or support such operations.

Figure 9:
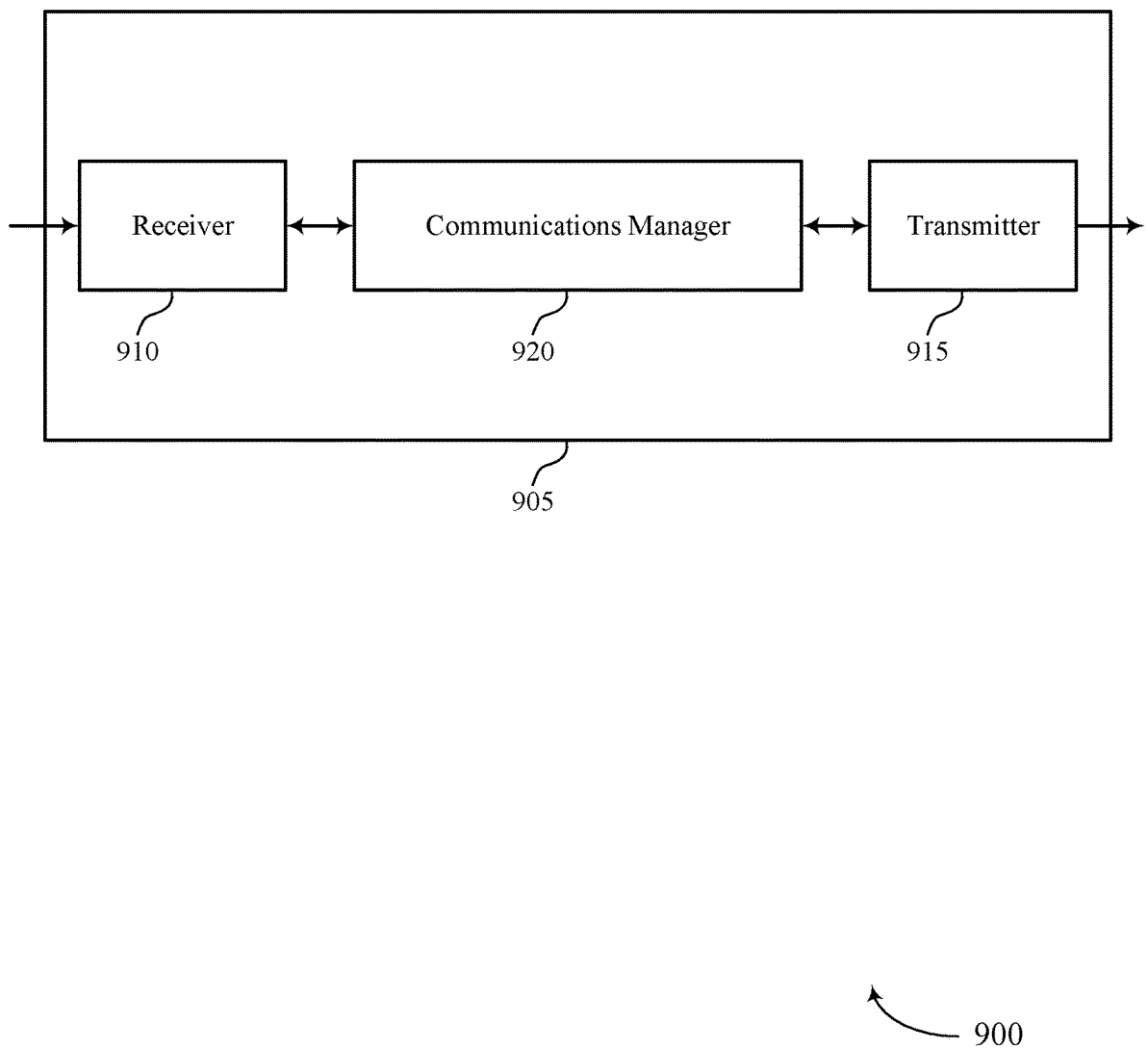
FIGS. 9 and 10 show block diagrams of devices that support index modulation for low-power ADCs in accordance with aspects of the present disclosure.

FIG. 9 shows a block diagram 900 of a device 905 that supports index modulation for low-power ADCs in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to index modulation for low-power ADCs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to index modulation for low-power ADCs). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of index modulation for low-power ADCs as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for receiving, from a UE, a first message including an indication of a quantity of subcarriers, the quantity of subcarriers being from a set of multiple subcarriers within a bandwidth, where the quantity of subcarriers is based on an SQNR, an SNR, one or more power consumption factors of the UE, or any combination thereof. The communications manager 920 may be configured as or otherwise support a means for determining, based on the indication of the quantity of subcarriers, a quantity of active subcarriers of the set of multiple subcarriers for index modulated communications with the UE. The communications manager 920 may be configured as or otherwise support a means for transmitting, to the UE, a second message including an indication of the quantity of active subcarriers.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for improved IM communications. For example, by communicating on a number of active subcarriers of an allocated bandwidth, the device 905 may support a reduced ADC resolution and/or a reduced ADC sampling frequency at another device. The device 905 may therefore receive communications from the other device more reliably and efficiently.

Figure 10:
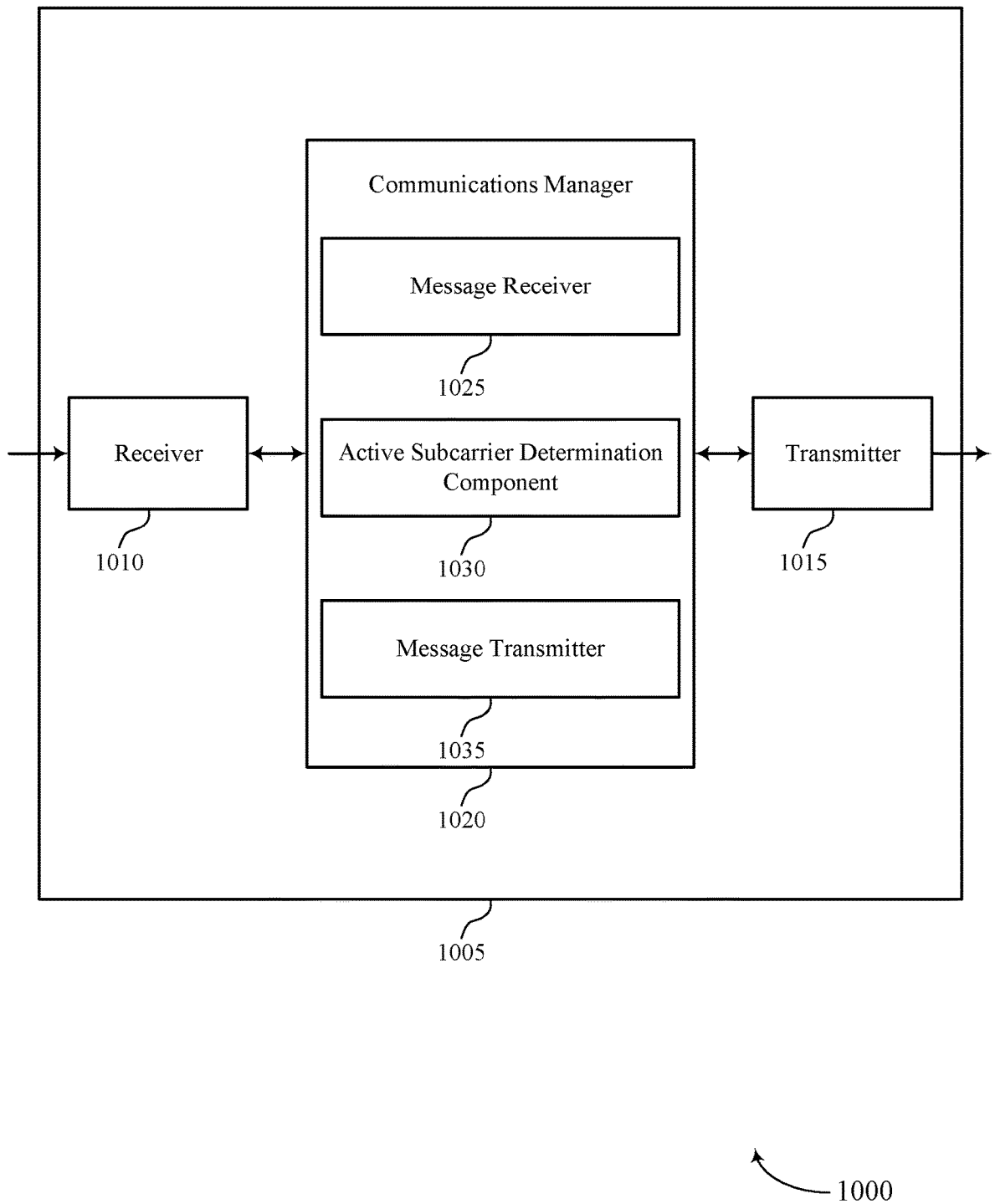

FIG. 10 shows a block diagram 1000 of a device 1005 that supports index modulation for low-power ADCs in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to index modulation for low-power ADCs). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to index modulation for low-power ADCs). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of index modulation for low-power ADCs as described herein. For example, the communications manager 1020 may include a message receiver 1025, an active subcarrier determination component 1030, a message transmitter 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The message receiver 1025 may be configured as or otherwise support a means for receiving, from a UE, a first message including an indication of a quantity of subcarriers, the quantity of subcarriers being from a set of multiple subcarriers within a bandwidth, where the quantity of subcarriers is based on an SQNR, an SNR, one or more power consumption factors of the UE, or any combination thereof. The active subcarrier determination component 1030 may be configured as or otherwise support a means for determining, based on the indication of the quantity of subcarriers, a quantity of active subcarriers of the set of multiple subcarriers for index modulated communications with the UE. The message transmitter 1035 may be configured as or otherwise support a means for transmitting, to the UE, a second message including an indication of the quantity of active subcarriers.

Figure 11:
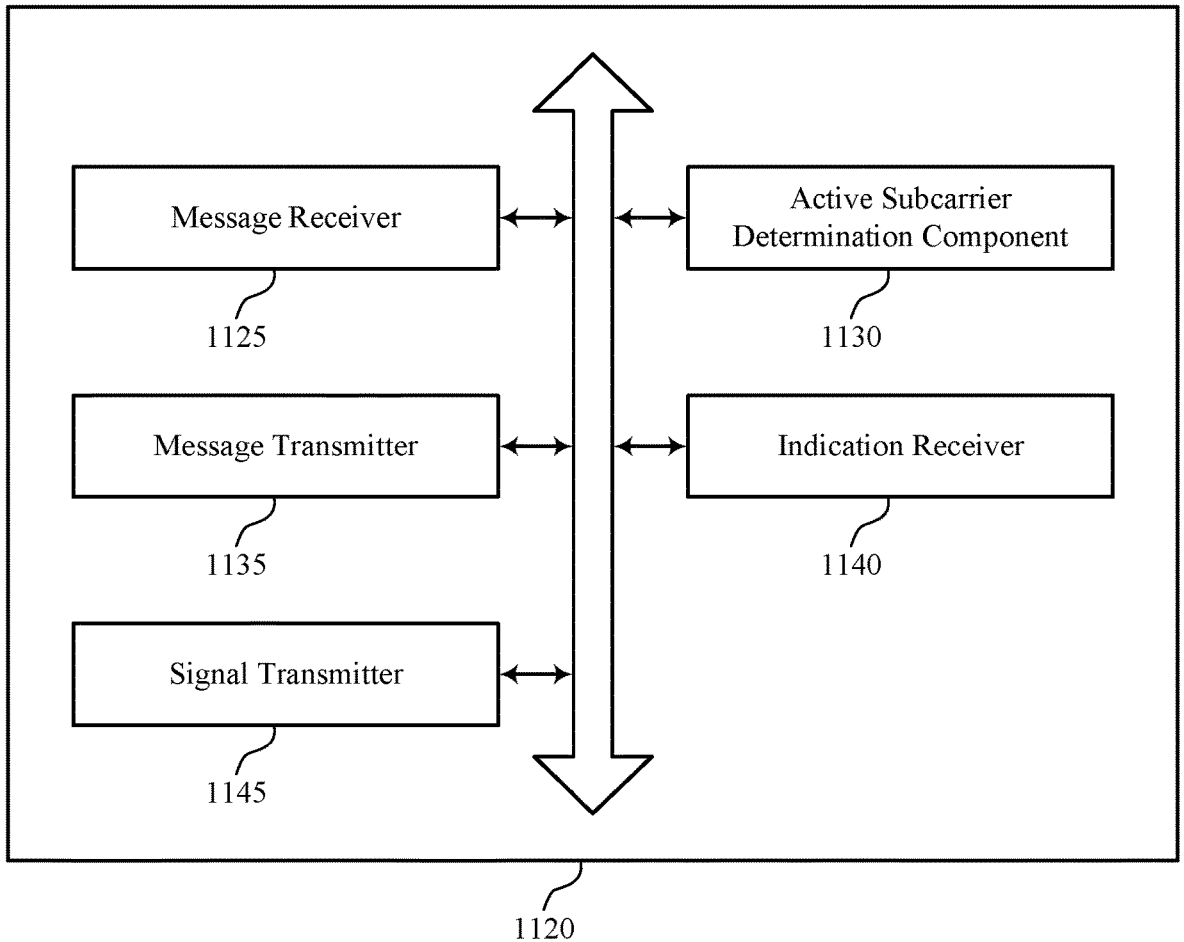
FIG. 11 shows a block diagram of a communications manager that supports index modulation for low-power ADCs in accordance with aspects of the present disclosure.

FIG. 11 shows a block diagram 1100 of a communications manager 1120 that supports index modulation for low-power ADCs in accordance with aspects of the present disclosure. The communications manager 1120 may be an example of aspects of a communications manager 920, a communications manager 1020, or both, as described herein. The communications manager 1120, or various components thereof, may be an example of means for performing various aspects of index modulation for low-power ADCs as described herein. For example, the communications manager 1120 may include a message receiver 1125, an active subcarrier determination component 1130, a message transmitter 1135, an indication receiver 1140, a signal transmitter 1145, or any combination thereof. Each of these components may communicate, directly or indirectly, with one another (e.g., via one or more buses).

The communications manager 1120 may support wireless communications at a base station in accordance with examples as disclosed herein. The message receiver 1125 may be configured as or otherwise support a means for receiving, from a UE, a first message including an indication of a quantity of subcarriers, the quantity of subcarriers being from a set of multiple subcarriers within a bandwidth, where the quantity of subcarriers is based on an SQNR, an SNR, one or more power consumption factors of the UE, or any combination thereof. The active subcarrier determination component 1130 may be configured as or otherwise support a means for determining, based on the indication of the quantity of subcarriers, a quantity of active subcarriers of the set of multiple subcarriers for index modulated communications with the UE. The message transmitter 1135 may be configured as or otherwise support a means for transmitting, to the UE, a second message including an indication of the quantity of active subcarriers.

In some examples, the indication receiver 1140 may be configured as or otherwise support a means for receiving, from the UE, an indication of a set of one or more subcarriers from the set of multiple subcarriers to be excluded from the index modulated communications, where determining the quantity of active subcarriers is based on the set of one or more subcarriers to the excluded from the index modulated communications.

In some examples, the indication of the set of one or more subcarriers includes one or more subcarrier indices corresponding to the set of one or more subcarriers to be excluded from the index modulated communications. In some examples, the set of one or more subcarriers to be excluded from the index modulated communications is based on one or more spurs associated with processing signals using an ADC of the UE. In some examples, the indication of the set of one or more subcarriers is received within the first message.

In some examples, the message transmitter 1135 may be configured as or otherwise support a means for transmitting, to the UE, a third message including an acknowledgement of the set of one or more subcarriers to be excluded. In some examples, the third message includes an indication that the set of one or more subcarriers is excluded from the index modulated communications or a list of subcarriers that are excluded from the index modulated communications.

In some examples, the first message including the indication of the quantity of subcarriers is received with a first periodicity. In some examples, the second message indicating the quantity of active subcarriers is transmitted with a second periodicity different from the first periodicity.

In some examples, the signal transmitter 1145 may be configured as or otherwise support a means for transmitting, to the UE, an index modulated downlink signal over one or more active subcarriers of the quantity of subcarriers based on the indication of the quantity of active subcarriers. In some examples, the second message and the index modulated downlink signal are transmitted within a same time period.

In some examples, the indication of the quantity of subcarriers includes an indication of a percentage of active subcarriers of the set of multiple subcarriers.

In some examples, the one or more power consumption factors include a battery status of the UE, one or more thermal parameters, power consumption allowed by the UE, or any combination thereof.

In some examples, the first message includes uplink control information.

Figure 12:
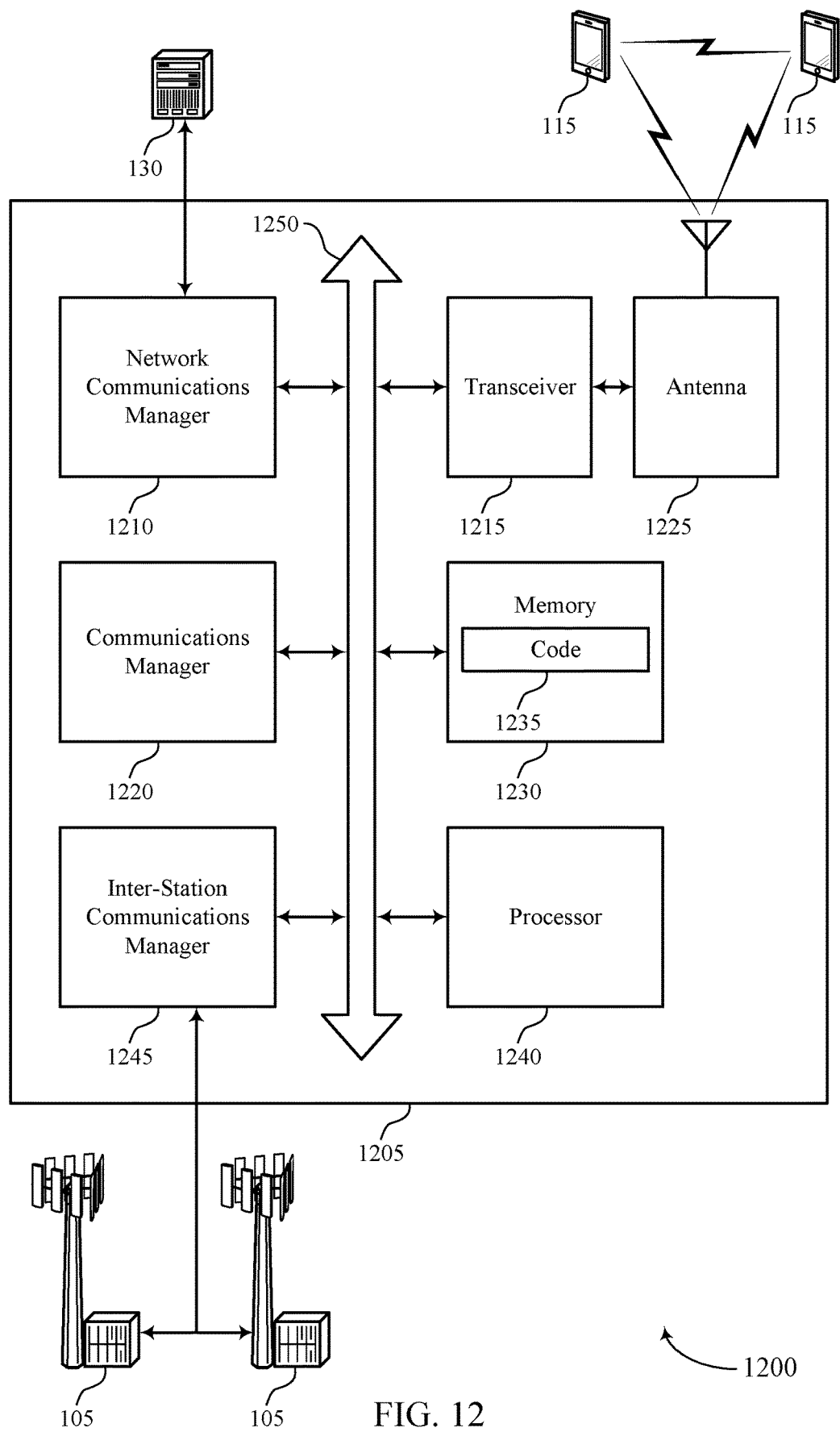
FIG. 12 shows a diagram of a system including a device that supports index modulation for low-power ADCs in accordance with aspects of the present disclosure.

FIG. 12 shows a diagram of a system 1200 including a device 1205 that supports index modulation for low-power ADCs in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting index modulation for low-power ADCs). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for receiving, from a UE, a first message including an indication of a quantity of subcarriers, the quantity of subcarriers being from a set of multiple subcarriers within a bandwidth, where the quantity of subcarriers is based on an SQNR, an SNR, one or more power consumption factors of the UE, or any combination thereof. The communications manager 1220 may be configured as or otherwise support a means for determining, based on the indication of the quantity of subcarriers, a quantity of active subcarriers of the set of multiple subcarriers for index modulated communications with the UE. The communications manager 1220 may be configured as or otherwise support a means for transmitting, to the UE, a second message including an indication of the quantity of active subcarriers.

By including or configuring the communications manager 1220 in accordance with examples as described herein, the device 1205 may support techniques for improved IM communications. For example, by communicating on a number of active subcarriers of an allocated bandwidth, the device 1205 may increase the transmit power of each active subcarrier. An increased transmit power may result in a higher SQNR and/or a higher SNR for signals transmitted on the active subcarriers, which may in turn increase communications reliability and system efficiency.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of index modulation for low-power ADCs as described herein, or the processor 1240 and the memory 1230 may be otherwise configured to perform or support such operations.

Figure 13:
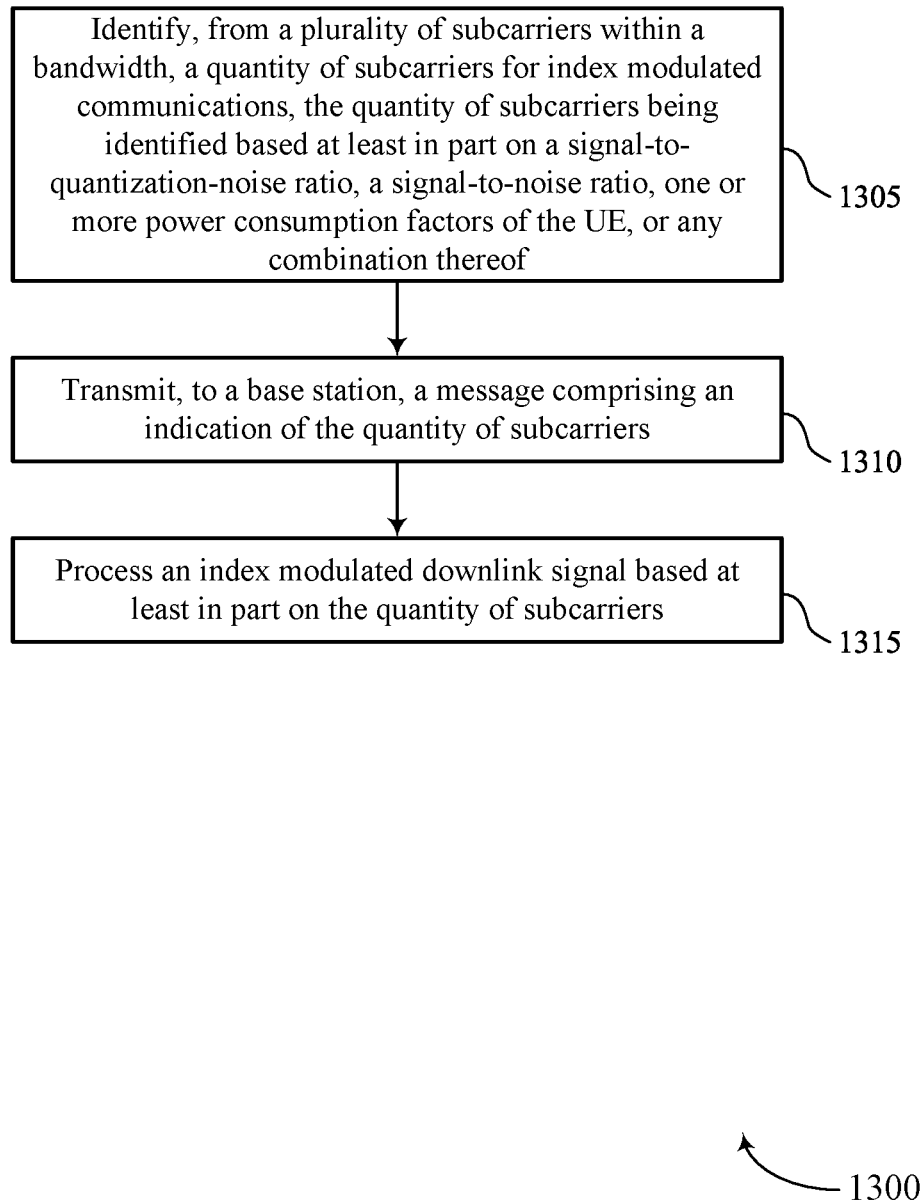
FIGS. 13 through 15 show flowcharts illustrating methods that support index modulation for low-power ADCs in accordance with aspects of the present disclosure.

FIG. 13 shows a flowchart illustrating a method 1300 that supports index modulation for low-power ADCs in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include identifying, from a set of multiple subcarriers within a bandwidth, a quantity of subcarriers for index modulated communications, the quantity of subcarriers being identified based on an SQNR, an SNR, one or more power consumption factors of the UE, or any combination thereof. The operations of 1305 may be performed in accordance with examples as disclosed herein. In some examples, aspects of the operations of 1305 may be performed by a subcarrier identifying component 725 as described with reference to FIG. 7.

At 1310, the method may include transmitting, to a base station, a message including an indication of the quantity of subcarriers. The operations of 1310 may be performed in accordance with examples as disclosed herein. In some examples, aspects of the operations of 1310 may be performed by a message transmitter 730 as described with reference to FIG. 7.

At 1315, the method may include processing an index modulated downlink signal based on the quantity of subcarriers. The operations of 1315 may be performed in accordance with examples as disclosed herein. In some examples, aspects of the operations of 1315 may be performed by a signal processor 735 as described with reference to FIG. 7.

Figure 14:
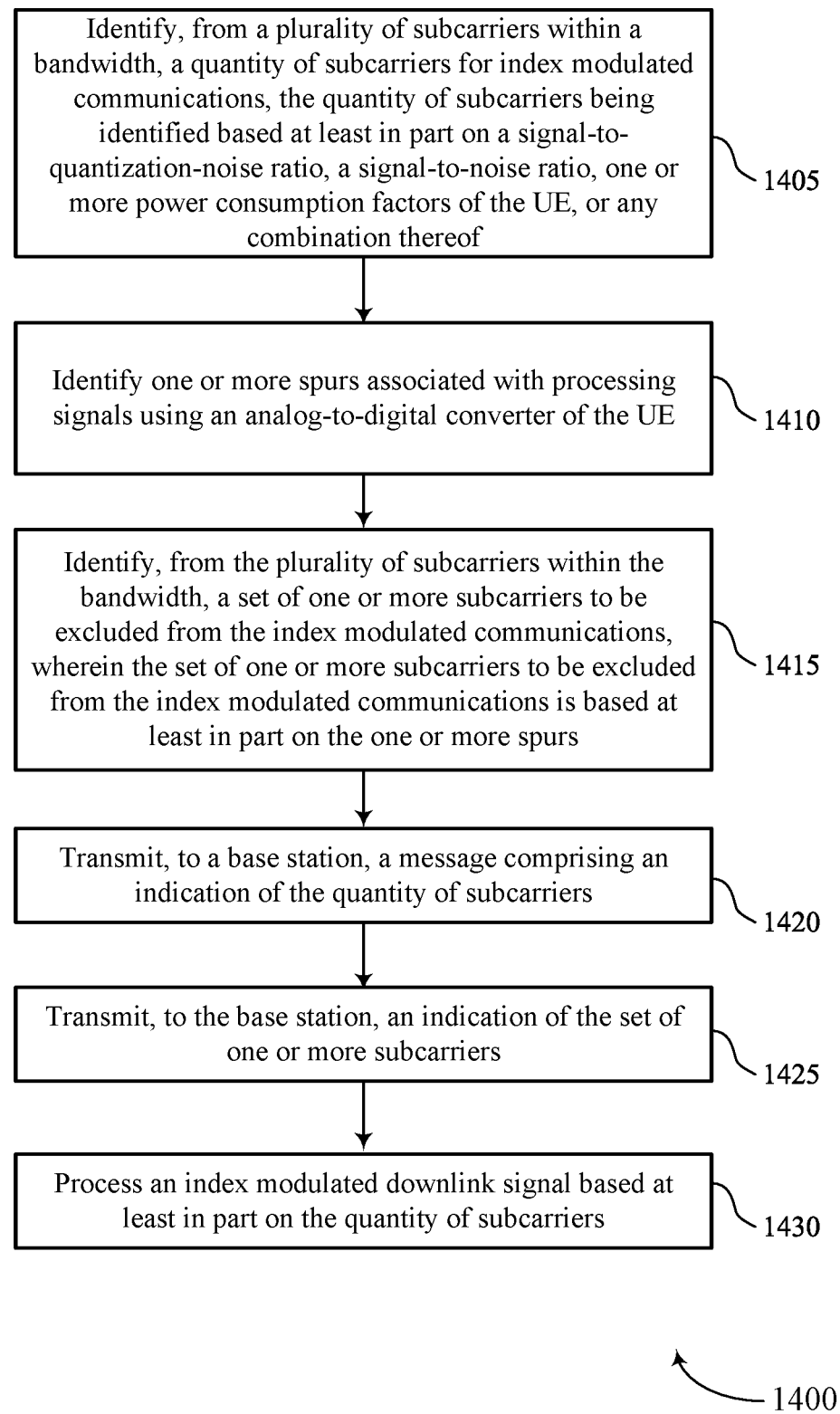

FIG. 14 shows a flowchart illustrating a method 1400 that supports index modulation for low-power ADCs in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include identifying, from a set of multiple subcarriers within a bandwidth, a quantity of subcarriers for index modulated communications, the quantity of subcarriers being identified based on an SQNR, an SNR, one or more power consumption factors of the UE, or any combination thereof. The operations of 1405 may be performed in accordance with examples as disclosed herein. In some examples, aspects of the operations of 1405 may be performed by a subcarrier identifying component 725 as described with reference to FIG. 7.

At 1410, the method may include identifying one or more spurs associated with processing signals using an ADC of the UE, The operations of 1410 may be performed in accordance with examples as disclosed herein. In some examples, aspects of the operations of 1410 may be performed by a spur identifying component 760 as described with reference to FIG. 7.

At 1415, the method may include identifying, from the set of multiple subcarriers within the bandwidth, a set of one or more subcarriers to be excluded from the index modulated communications, where the set of one or more subcarriers to be excluded from the index modulated communications is based on the one or more spurs. The operations of 1415 may be performed in accordance with examples as disclosed herein. In some examples, aspects of the operations of 1415 may be performed by a subcarrier identifying component 725 as described with reference to FIG. 7.

At 1420, the method may include transmitting, to a base station, a message including an indication of the quantity of subcarriers. The operations of 1420 may be performed in accordance with examples as disclosed herein. In some examples, aspects of the operations of 1420 may be performed by a message transmitter 730 as described with reference to FIG. 7.

At 1425, the method may include transmitting, to the base station, an indication of the set of one or more subcarriers. The operations of 1425 may be performed in accordance with examples as disclosed herein. In some examples, aspects of the operations of 1425 may be performed by an indication transmitter 740 as described with reference to FIG. 7.

At 1430, the method may include processing an index modulated downlink signal based on the quantity of subcarriers. The operations of 1430 may be performed in accordance with examples as disclosed herein. In some examples, aspects of the operations of 1430 may be performed by a signal processor 735 as described with reference to FIG. 7.

Figure 15:
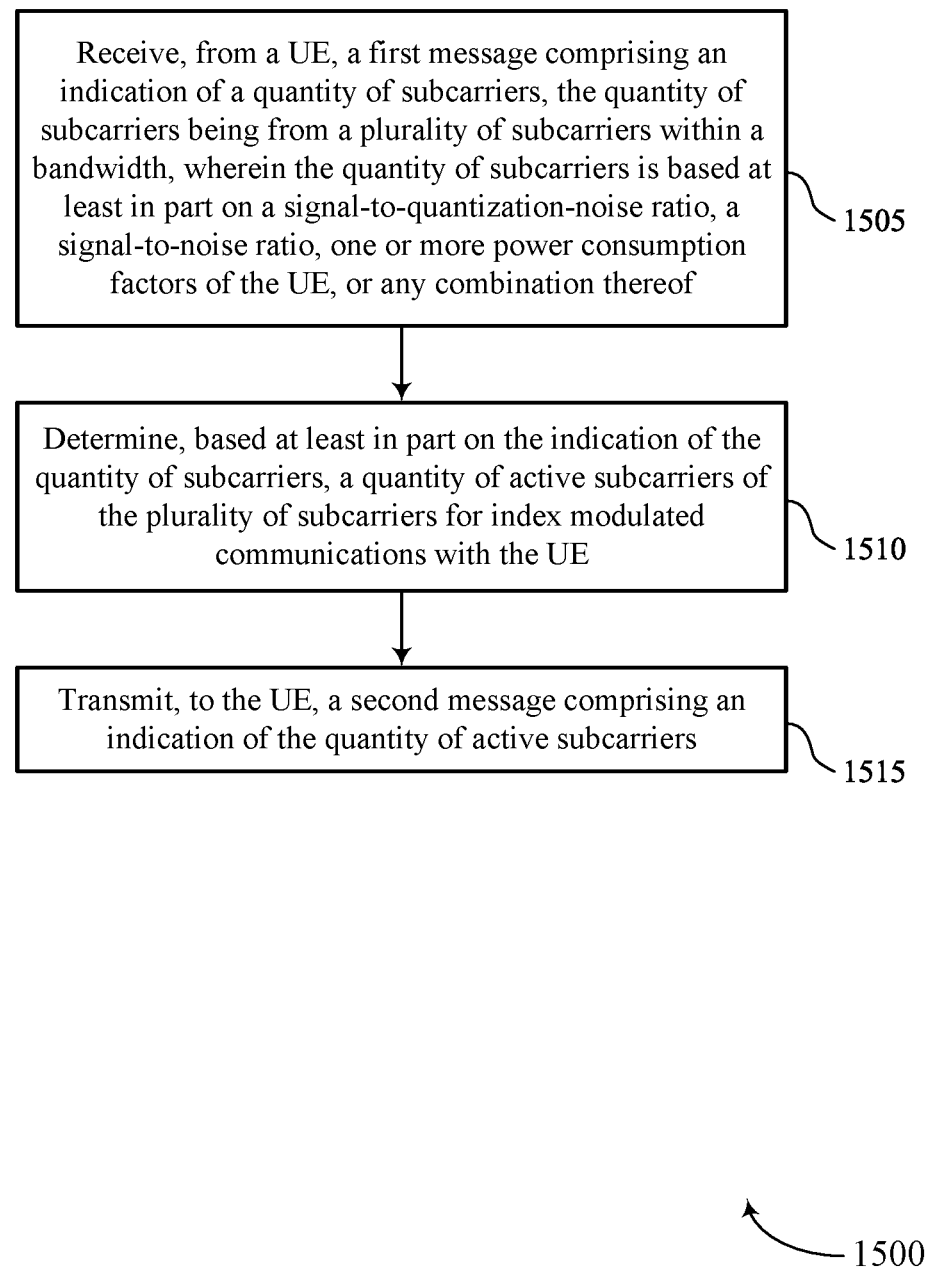

FIG. 15 shows a flowchart illustrating a method 1500 that supports index modulation for low-power ADCs in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include receiving, from a UE, a first message including an indication of a quantity of subcarriers, the quantity of subcarriers being from a set of multiple subcarriers within a bandwidth, where the quantity of subcarriers is based on an SQNR, an SNR, one or more power consumption factors of the UE, or any combination thereof. The operations of 1505 may be performed in accordance with examples as disclosed herein. In some examples, aspects of the operations of 1505 may be performed by a message receiver 1125 as described with reference to FIG. 11.

At 1510, the method may include determining, based on the indication of the quantity of subcarriers, a quantity of active subcarriers of the set of multiple subcarriers for index modulated communications with the UE. The operations of 1510 may be performed in accordance with examples as disclosed herein. In some examples, aspects of the operations of 1510 may be performed by an active subcarrier determination component 1130 as described with reference to FIG. 11.

At 1515, the method may include transmitting, to the UE, a second message including an indication of the quantity of active subcarriers. The operations of 1515 may be performed in accordance with examples as disclosed herein. In some examples, aspects of the operations of 1515 may be performed by a message transmitter 1135 as described with reference to FIG. 11.

The following provides an overview of aspects of the present disclosure:

Aspect 1: A method for wireless communication at a UE, comprising: identifying, from a plurality of subcarriers within a bandwidth, a quantity of subcarriers for index modulated communications, the quantity of subcarriers being identified based at least in part on an SQNR, an SNR, one or more power consumption factors of the UE, or any combination thereof; transmitting, to a base station, a message comprising an indication of the quantity of subcarriers; and processing an index modulated downlink signal based at least in part on the quantity of subcarriers.

Aspect 2: The method of aspect 1, further comprising: identifying, from the plurality of subcarriers within the bandwidth, a set of one or more subcarriers to be excluded from the index modulated communications; and transmitting, to the base station, an indication of the set of one or more subcarriers.

Aspect 3: The method of aspect 2, further comprising: identifying one or more subcarrier indices corresponding to the set of one or more subcarriers, wherein the indication of the set of one or more subcarriers comprises the one or more subcarrier indices.

Aspect 4: The method of any of aspects 2 through 3, further comprising: identifying one or more spurs associated with processing signals using an ADC of the UE, wherein the set of one or more subcarriers to be excluded from the index modulated communications is based at least in part on the one or more spurs.

Aspect 5: The method of any of aspects 2 through 4, wherein the indication of the set of one or more subcarriers is transmitted within the message.

Aspect 6: The method of any of aspects 2 through 5, further comprising: receiving, from the base station, a second message comprising an acknowledgement of the set of one or more subcarriers to be excluded.

Aspect 7: The method of aspect 6, wherein the second message comprises an indication that the set of one or more subcarriers is excluded from the index modulated communications or a list of subcarriers that are excluded from the index modulated communications.

Aspect 8: The method of any of aspects 1 through 7, further comprising: receiving, from the base station, a third message comprising an indication of a quantity of active subcarriers for the index modulated communications, the quantity of active subcarriers being based at least in part on the indication of the quantity of subcarriers; and receiving the index modulated downlink signal over one or more active subcarriers.

Aspect 9: The method of aspect 8, wherein the message comprising the indication of the quantity of subcarriers is transmitted with a first periodicity; and the third message indicating the quantity of active subcarriers is received with a second periodicity different from the first periodicity.

Aspect 10: The method of any of aspects 8 through 9, wherein the third message and the index modulated downlink signal are received within a same time period.

Aspect 11: The method of any of aspects 8 through 10, wherein the third message comprises DCI.

Aspect 12: The method of any of aspects 8 through 11, wherein the message comprises UCI.

Aspect 13: The method of any of aspects 1 through 12, wherein processing the index modulated downlink signal comprises: processing the index modulated downlink signal using an ADC, the ADC being configured with a resolution size based at least in part on the quantity of subcarriers.

Aspect 14: The method of any of aspects 1 through 13, wherein identifying the quantity of subcarriers comprises: determining a percentage of active subcarriers from the plurality of subcarriers, wherein the indication of the quantity of subcarriers comprises an indication of the percentage of active subcarriers.

Aspect 15: The method of any of aspects 1 through 14, wherein the one or more power consumption factors comprise a battery status of the UE, one or more thermal parameters, power consumption allowed by the UE, or any combination thereof.

Aspect 16: A method for wireless communications at a base station, comprising: receiving, from a UE, a first message comprising an indication of a quantity of subcarriers, the quantity of subcarriers being from a plurality of subcarriers within a bandwidth, wherein the quantity of subcarriers is based at least in part on an SQNR, an SNR, one or more power consumption factors of the UE, or any combination thereof; determining, based at least in part on the indication of the quantity of subcarriers, a quantity of active subcarriers of the plurality of subcarriers for index modulated communications with the UE; and transmitting, to the UE, a second message comprising an indication of the quantity of active subcarriers.

Aspect 17: The method of aspect 16, further comprising: receiving, from the UE, an indication of a set of one or more subcarriers from the plurality of subcarriers to be excluded from the index modulated communications, wherein determining the quantity of active subcarriers is based at least in part on the set of one or more subcarriers to the excluded from the index modulated communications.

Aspect 18: The method of aspect 17, wherein the indication of the set of one or more subcarriers comprises one or more subcarrier indices corresponding to the set of one or more subcarriers to be excluded from the index modulated communications.

Aspect 19: The method of any of aspects 17 through 18, wherein the set of one or more subcarriers to be excluded from the index modulated communications is based at least in part on one or more spurs associated with processing signals using an ADC of the UE.

Aspect 20: The method of any of aspects 17 through 19, wherein the indication of the set of one or more subcarriers is received within the first message.

Aspect 21: The method of any of aspects 17 through 20, further comprising: transmitting, to the UE, a third message comprising an acknowledgement of the set of one or more subcarriers to be excluded.

Aspect 22: The method of aspect 21, wherein the third message comprises an indication that the set of one or more subcarriers is excluded from the index modulated communications or a list of subcarriers that are excluded from the index modulated communications.

Aspect 23: The method of any of aspects 16 through 22, wherein the first message comprising the indication of the quantity of subcarriers is received with a first periodicity; and the second message indicating the quantity of active subcarriers is transmitted with a second periodicity different from the first periodicity.

Aspect 24: The method of any of aspects 16 through 23, further comprising: transmitting, to the UE, an index modulated downlink signal over one or more active subcarriers of the quantity of subcarriers based at least in part on the indication of the quantity of active subcarriers.

Aspect 25: The method of aspect 24, wherein the second message and the index modulated downlink signal are transmitted within a same time period.

Aspect 26: The method of any of aspects 16 through 25, wherein the indication of the quantity of subcarriers comprises an indication of a percentage of active subcarriers of the plurality of subcarriers.

Aspect 27: The method of any of aspects 16 through 26, wherein the one or more power consumption factors comprise a battery status of the UE, one or more thermal parameters, power consumption allowed by the UE, or any combination thereof.

Aspect 28: The method of any of aspects 16 through 27, wherein the first message comprises UCI.

Aspect 29: An apparatus for wireless communication at a UE, comprising a processor; memory coupled with the processor; and instructions stored in the memory and executable by the processor to cause the apparatus to perform a method of any of aspects 1 through 15.

Aspect 30: An apparatus for wireless communication at a UE, comprising at least one means for performing a method of any of aspects 1 through 15.

Aspect 31: A non-transitory computer-readable medium storing code for wireless communication at a UE, the code comprising instructions executable by a processor to perform a method of any of aspects 1 through 15.

Aspect 32: An apparatus for wireless communications at a base station, comprising a processor; memory coupled with the processor; and instructions stored in the memory and executable by the processor to cause the apparatus to perform a method of any of aspects 16 through 28.

Aspect 33: An apparatus for wireless communications at a base station, comprising at least one means for performing a method of any of aspects 16 through 28.

Aspect 34: A non-transitory computer-readable medium storing code for wireless communications at a base station, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    identifying, from a plurality of subcarriers within a bandwidth, a quantity of subcarriers for index modulated communications, the quantity of subcarriers being identified based at least in part on a signal-to-quantization-noise ratio, a signal-to-noise ratio, one or more power consumption factors of the UE, or any combination thereof;
    transmitting, to a base station, a first message comprising an indication of the quantity of subcarriers; and
    processing an index modulated downlink signal based at least in part on the quantity of subcarriers.

2. The method of claim 1, further comprising:
    identifying, from the plurality of subcarriers within the bandwidth, a set of one or more subcarriers to be excluded from the index modulated communications; and transmitting, to the base station, an indication of the set of one or more subcarriers.

3. The method of claim 2, further comprising:
identifying one or more subcarrier indices corresponding to the set of one or more subcarriers, wherein the indication of the set of one or more subcarriers comprises the one or more subcarrier indices.

4. The method of claim 2, further comprising:
identifying one or more spurs associated with processing signals using an analog-to-digital converter of the UE, wherein the set of one or more subcarriers to be excluded from the index modulated communications is based at least in part on the one or more spurs.

5. The method of claim 2, wherein the indication of the set of one or more subcarriers is transmitted within the first message.

6. The method of claim 2, further comprising:
receiving, from the base station, a second message comprising an acknowledgement of the set of one or more subcarriers to be excluded.

7. The method of claim 6, wherein the second message comprises an indication that the set of one or more subcarriers is excluded from the index modulated communications or a list of subcarriers that are excluded from the index modulated communications.

8. The method of claim 1, further comprising:
receiving, from the base station, a third message comprising an indication of a quantity of active subcarriers for the index modulated communications, the quantity of active subcarriers being based at least in part on the indication of the quantity of subcarriers; and
receiving the index modulated downlink signal over one or more active subcarriers.

9. The method of claim 8, wherein:
the first message comprising the indication of the quantity of subcarriers is transmitted with a first periodicity; and
the third message indicating the quantity of active subcarriers is received with a second periodicity different from the first periodicity.

10. The method of claim 8, wherein the third message and the index modulated downlink signal are received within a same time period.

11. The method of claim 8, wherein the third message comprises downlink control information.

12. The method of claim 8, wherein the first message comprises uplink control information.

13. The method of claim 1, wherein processing the index modulated downlink signal comprises:
processing the index modulated downlink signal using an analog-to-digital converter, the analog-to-digital converter being configured with a resolution size based at least in part on the quantity of subcarriers.

14. The method of claim 1, wherein identifying the quantity of subcarriers comprises:
determining a percentage of active subcarriers from the plurality of subcarriers, wherein the indication of the quantity of subcarriers comprises an indication of the percentage of active subcarriers.

15. The method of claim 1, wherein the one or more power consumption factors comprise a battery status of the UE, one or more thermal parameters, power consumption allowed by the UE, or any combination thereof.

16. A method for wireless communications at a base station, comprising:
receiving, from a user equipment (UE), a first message comprising an indication of a quantity of subcarriers, the quantity of subcarriers being from a plurality of subcarriers within a bandwidth, wherein the quantity of subcarriers is based at least in part on a signal-to-quantization-noise ratio, a signal-to-noise ratio, one or more power consumption factors of the UE, or any combination thereof;
determining, based at least in part on the indication of the quantity of subcarriers, a quantity of active subcarriers of the plurality of subcarriers for index modulated communications with the UE; and
transmitting, to the UE, a second message comprising an indication of the quantity of active subcarriers.

17. The method of claim 16, further comprising:
receiving, from the UE, an indication of a set of one or more subcarriers from the plurality of subcarriers to be excluded from the index modulated communications, wherein determining the quantity of active subcarriers is based at least in part on the set of one or more subcarriers to be excluded from the index modulated communications.

18. The method of claim 17, wherein the indication of the set of one or more subcarriers comprises one or more subcarrier indices corresponding to the set of one or more subcarriers to be excluded from the index modulated communications.

19. The method of claim 17, wherein the set of one or more subcarriers to be excluded from the index modulated communications is based at least in part on one or more spurs associated with processing signals using an analog-to-digital converter of the UE.

20. The method of claim 17, wherein the indication of the set of one or more subcarriers is received within the first message.

21. The method of claim 17, further comprising:
transmitting, to the UE, a third message comprising an acknowledgement of the set of one or more subcarriers to be excluded.

22. The method of claim 21, wherein the third message comprises an indication that the set of one or more subcarriers is excluded from the index modulated communications or a list of subcarriers that are excluded from the index modulated communications.

23. The method of claim 16, wherein:
the first message comprising the indication of the quantity of subcarriers is received with a first periodicity; and
the second message indicating the quantity of active subcarriers is transmitted with a second periodicity different from the first periodicity.

24. The method of claim 16, further comprising:
transmitting, to the UE, an index modulated downlink signal over one or more active subcarriers of the quantity of subcarriers based at least in part on the indication of the quantity of active subcarriers.

25. The method of claim 24, wherein the second message and the index modulated downlink signal are transmitted within a same time period.

26. The method of claim 16, wherein the indication of the quantity of subcarriers comprises an indication of a percentage of active subcarriers of the plurality of subcarriers.

27. The method of claim 16, wherein the one or more power consumption factors comprise a battery status of the UE, one or more thermal parameters, power consumption allowed by the UE, or any combination thereof.

28. The method of claim 16, wherein the first message comprises uplink control information.

29. An apparatus for wireless communication at a user equipment (UE), comprising:
a processor;

memory coupled with the processor; and instructions stored in the memory and executable by the processor to cause the apparatus to:

identify, from a plurality of subcarriers within a bandwidth, a quantity of subcarriers for index modulated communications, the quantity of subcarriers being identified based at least in part on a signal-to-quantization-noise ratio, a signal-to-noise ratio, one or more power consumption factors of the UE, or any combination thereof;

transmit, to a base station, a first message comprising an indication of the quantity of subcarriers; and process an index modulated downlink signal based at least in part on the quantity of subcarriers.

30. An apparatus for wireless communications at a base station, comprising:

a processor;

memory coupled with the processor; and instructions stored in the memory and executable by the processor to cause the apparatus to:

receive, from a user equipment (UE), a first message comprising an indication of a quantity of subcarriers, the quantity of subcarriers being from a plurality of subcarriers within a bandwidth, wherein the quantity of subcarriers is based at least in part on a signal-to-quantization-noise ratio, a signal-to-noise ratio, one or more power consumption factors of the UE, or any combination thereof;

determine, based at least in part on the indication of the quantity of subcarriers, a quantity of active subcarriers of the plurality of subcarriers for index modulated communications with the UE; and transmit, to the UE, a second message comprising an indication of the quantity of active subcarriers.

* * * * *